United States Patent
Gonzalez Garrido et al.

(10) Patent No.: US 10,397,932 B2
(45) Date of Patent: Aug. 27, 2019

(54) SYSTEM AND METHOD FOR DECENTRALIZED CONTROL OF WIRELESS NETWORKS

(71) Applicant: AOIFE SOLUTIONS, S.L., Camas (Seville) (ES)

(72) Inventors: Jose Ayub Gonzalez Garrido, Seville (ES); Jose Delgado Alonso, Seville (ES)

(73) Assignee: AOIFE SOLUTIONS, S.L., Camas (Seville) (ES)

(*) Notice: Subject to any disclaimer, the term of this patent is extended or adjusted under 35 U.S.C. 154(b) by 26 days.

(21) Appl. No.: 15/028,862

(22) PCT Filed: Mar. 19, 2014

(86) PCT No.: PCT/ES2014/070196
§ 371 (c)(1),
(2) Date: Apr. 12, 2016

(87) PCT Pub. No.: WO2015/055871
PCT Pub. Date: Apr. 23, 2015

(65) Prior Publication Data
US 2016/0262163 A1    Sep. 8, 2016

(30) Foreign Application Priority Data

Oct. 15, 2013 (ES) .................................. 201331514

(51) Int. Cl.
*H04W 72/08*   (2009.01)
*H04W 16/10*   (2009.01)
(Continued)

(52) U.S. Cl.
CPC ........ *H04W 72/082* (2013.01); *H04B 17/345* (2015.01); *H04L 41/12* (2013.01);
(Continued)

(58) Field of Classification Search
None
See application file for complete search history.

(56) References Cited

U.S. PATENT DOCUMENTS

2002/0164997 A1* 11/2002 Parry ...................... H04L 29/06
                                                        455/456.1
2006/0094370 A1    5/2006 Nguyen
(Continued)

FOREIGN PATENT DOCUMENTS

WO    2005099174 A1    10/2005

OTHER PUBLICATIONS

International Search Report dated Oct. 2, 2014 for PCT/ES2014/070196 and English translation.

*Primary Examiner* — Chi H Pham
*Assistant Examiner* — Raul Rivas
(74) *Attorney, Agent, or Firm* — Lucas & Mercanti, LLP

(57) ABSTRACT

System and method for decentralized control of wireless networks, made up by a set of access points (AP) that provide connection service to a set of stations (STA). The method comprises carrying out, during the start-up process, an automatic selection of the transmission channel (S7) of each access point (AP) to minimize interference, and which is based on the following information transmitted between the access points (AP) in the network:
- a list of the access points (AP) that are within the range of reach of each access point (AP) in the network;
- the powers with which each access point (AP) receives signals from the access points within its reach;
- a list of preferred channels, with the lowest level of interference, for each access point (AP) in the network.

The method also enables, among other features, carrying out an automatic transmit power selection (S8).

19 Claims, 14 Drawing Sheets

(51) Int. Cl.
*H04W 52/50* (2009.01)
*H04B 17/345* (2015.01)
*H04L 12/24* (2006.01)
*H04W 72/04* (2009.01)
*H04W 24/02* (2009.01)
*H04W 92/20* (2009.01)
*H04W 52/14* (2009.01)
*H04W 52/36* (2009.01)
*H04W 84/12* (2009.01)
*H04W 88/08* (2009.01)

(52) U.S. Cl.
CPC ........... *H04W 16/10* (2013.01); *H04W 52/50* (2013.01); *H04W 72/0453* (2013.01); *H04W 24/02* (2013.01); *H04W 52/143* (2013.01); *H04W 52/36* (2013.01); *H04W 84/12* (2013.01); *H04W 88/08* (2013.01); *H04W 92/20* (2013.01)

(56) References Cited

U.S. PATENT DOCUMENTS

| | | |
|---|---|---|
| 2006/0223443 A1 | 10/2006 | Reudink |
| 2008/0240008 A1 | 10/2008 | Backes et al. |
| 2009/0092101 A1 | 4/2009 | Busch et al. |
| 2011/0250858 A1 | 10/2011 | Jain et al. |
| 2012/0224484 A1* | 9/2012 | Babiarz ............... H04L 41/5019 370/235 |

\* cited by examiner

SYSTEM AND METHOD FOR DECENTRALIZED CONTROL OF WIRELESS NETWORKS

CROSS REFERENCE TO RELATED APPLICATION

This Application is a 371 of PCT/ES2014/070196 filed on Mar. 19, 2014, which claims priority of Spanish Patent Application No. P201331514 filed Oct. 15, 2013, each of which are incorporated herein by reference.

SUBJECT MATTER OF THE INVENTION

The present invention relates to a decentralized control technology for wireless network installation, which distributes the control logic between all of the access points that make up the network, eliminating the centralized controller from the network architecture by means of communication between the access points themselves, thus substantially improving the efficiency of the management of the wireless network itself.

BACKGROUND ART

By way of introduction, it is well-known that wireless local area networks, also known as WLAN, are a flexible wireless communications system that is widely used as an alternative to wired local area networks, or as an extension of the same. They use radio frequency technologies that enable greater user mobility by minimizing wired connections. These networks have become increasingly important in a number of fields, such as warehouses or manufacturing, wherein information is transmitted in real time to a central terminal. They are also very popular in homes for sharing Internet access between various computers.

In a typical wireless LAN configuration, the access points (AP) connect the fixed location wired network by means of standard wiring. The access point (AP) receives the information, stores it, and transmits it between the WLAN and the wired LAN. One single access point can support a small group of users, and can function with a reach of at least thirty meters, and up to several hundred meters.

In general, WLAN networks operate using the IEEE 802.11 protocols.

The use of WLAN networks is spreading further and further, taking on large-scale facilities, which can comprise several hundred access points. These extensive networks tend to respond to usages involving high user density.

The main problem with WLAN networks is that, since they use radio transmission, interference occurs between the clients and the access points. The number of radio channels is very limited, and the requirement of providing service to a high number of users implies having to re-use the channels in more than one access point. This increases the number of instances of interference, as well as the level of electromagnetic noise in the environment.

Furthermore, each access point has a fixed configuration, which makes it hard to expand the networks, as adding a new access point to the network has consequences for the configuration of each existing access point in the network.

As for the state of the art and its development through time, Wi-Fi systems were originally autonomous. Each access point had the full ability to create its cell, and manage both the clients associated with the same and the communications between them, and between these clients and the wired network.

When Wi-Fi networks ceased to be an one-time solution for solving specific, small-scale problems, and became large and complex systems supporting a significant portion of companies' communications, or, in some cases, became a source of income in and of themselves (as in the case of airport hot-spots), the need arose to have centralized management systems.

The emergence of these systems was brought about by the high cost of access points in their early days. To bring down the cost of these large systems, it was decided that the access points should be made less intelligent, and this intelligence was then transferred to a centralized system. It is true that the cost of this control system is usually high, but if the system is large, the reduction in the price of each access point makes up for this fact, and the overall price is lower than if the system were made with autonomous access points.

Over time, Wi-Fi networks gradually became able to support more services, and more and more was demanded of them, as more features and configuration options had to be provided in order to make them suitable for the applications and services that made use of them. In systems with a high number of access points, the manual configuration and maintenance of each one of them, along with error detection and correction thereof, became too complex, and the cost in terms of time and personnel became too high.

The aim of centralized management systems is to alleviate these problems and offer added features. While it is true that it is not possible to list all the features of these systems, as there is no single model and each manufacturer adopts the approach it deems best, still, they tend to have some basic characteristics and features in common.

Normally, the controller is sold as a closed, independent system, but inside it is always a computer with associated and pre-installed software, to which the user does not have access, except through the configuration console. In any case, the controllers are connected to the client's Ethernet connection, from which they detect the access points with which it is compatible. Once detected, it carries out a prior configuration of the same, and will enable them to be centrally managed from one single point, the controller.

Depending on the manufacturer, different measures are implemented to choose which access points are to be managed, either through preconfiguration of the IP address at the access point, or through some type of filter and key in the controller. Once the access point has been added, a base configuration is automatically defined for it, which reduces installation times and minimizes configuration errors.

There is a trend towards a context, then, for the installation of new systems to be simplified so that, in addition, after its initial deployment, the controller makes it possible to configure the various access points from a single console, individually, in groups, or globally, as well as receive alarms concerning their operations.

As mentioned, their features depend on each manufacturer, but these are a few of the ones that are offered:

Centralized management: One single console for managing the various access points.

Centralization of events: In broad systems, with a high number of access points, it is not feasible to access each one to learn of the events that have taken place, and then connect the data obtained from each one of them. The controller makes it possible to automate this process, saving on costs and increasing the reliability of the network.

Heightened and centralized security: Makes it possible to manage the admission of Wi-Fi clients, define profiles, grant clients access to different parts of the network or to services based on their identity, filters, and access detection.

At present, there are various manufacturers who have designed their own exclusive protocols for managing the control of their own wireless networks based on standard IEEE 802.11. One of the most widespread has been LWAPP (Lightweight Access Point Protocol). This network protocol is used to centrally manage several access points in a WLAN wireless network. There are two layer modes, the already obsolete Layer 2 mode, and Layer 3 mode, which are found by default in most devices.

Initially developed by Airespace and NTT DoCoMo, and eventually approved as a standard by the IETF (Internet Engineering Task Force) in RFC 5412, the aims of this protocol are:

To use the simplest and cheapest access points possible.
As many tasks are removed as possible.
To centralize filtering, QoS, authentification and encryption tasks in one centralized device.
To provide a vendor-independent encapsulation and transport mechanism.

CAPWAP (Control and Provisioning of Wireless Access Points) is a standard that emerged out of LWAPP. The specifications of the protocol are described in RFC 5415, and in RFC 5416 a binding to standard 802.11 is provided.

The state machine of CAPWAP is similar to that of LWAPP, but with the addition of the establishment of a DTLS (Datagram Transport Layer Security) tunnel. The standard provides configuration management and device management, allowing for configurations and firmware to be loaded onto the access points from the controller.

This protocol differentiates between data traffic and control traffic, as LWAPP does. However, only the control messages are transmitted by means of a DTLS tunnel. Both the access points and controllers must be preconfigured in order to associate with each other. Both the AP and the controller must be loaded with either PSKs or certificate files to enable encrypted communication.

Subsequently, the trend on the market has been to simplify the access points by centralizing the management logic in one single device. This decision is based on the fact that when deploying wireless networks in areas with high user density, the number of access points grows considerably. However, at present there are a number of embedded SoC (Systems on a Chip) alternatives, based on ARM architecture, that enable high data processing capacity at a low cost. This makes it possible to make the access points more complex with practically no impact on cost.

To conclude, the present invention provides, vis-à-vis the state of the art, a decentralized control technology for wireless networks, which distributes the control logic between all of the access points that make up the network, eliminating the centralized controller from the network architecture by means of communication between the access points themselves, which ensures efficient management of the resources of the wireless network.

The advantages that this architecture provides are the following:

Because it is decentralized, it is not dependent on any particular element, as all of the access points behave like small controllers that are able to interoperate with each other.
Each node behaves like a controller and provides support to the adjacent nodes.
The network tasks are thus distributed, without overloading any one element, thus preventing bottlenecks.
It reduces the high hardware costs of the centralized controller.
It is 100% scalable, making it possible to add more access points without having to increase the capabilities of the centralized controller.
It enables management from any point with network access.
Redundancy to failures, as the logic of the controller and, as such, the operations of the network is not compromised by the failure of any one access point.
Automatic configuration of the transmit power of the access points belonging to the network in order to reduce unnecessary interference.
Automatic configuration of the channel used by each access point belonging to the network in order to reduce interference between access points and increase the number of simultaneous transmissions in a limited physical environment.
Automatic selection of the access point that provides service to a new station or user (STA, "Station"), in order to reduce interference between access points and stations operating on the same channel or on different channels.
Balance the network load with the aim of reducing interference within the network and the number of hidden nodes, as well as taking advantage of the total transmission capacity of the network to prevent bottlenecks from arising in some access points while others remain idle.
Exclusion of users based on location, denying service to users who are located outside the range of operation of the network when these users receive the signal of the network.

SUMMARY OF THE INVENTION

The present invention relates to a system for decentralized control of wireless networks, made up of a set of access points (APs) that provide connection service to a set of users or STAs. It is based on the implementation of a technology that makes it possible to deploy a communication protocol between the access points making up the network, along with a series of methods used by each access point, the viability of which depends on the very architecture of the access point, which contains the following units:

a) Physical Layer—Driver.
b) QoS control unit.
c) Real-time measurement of physical layer characteristics unit.
d) Physical layer control unit.
e) Decentralized controller.

Thus, this wireless network is made up of a set of access points (APs) that provide connection service to a set of stations or STAs.

To ensure communication between any two access points making up the wireless network, the decentralized controller carries out various functions to improve interoperability between the same.

To carry out these functions, it makes use of real-time measurements of the physical layer characteristics, such as transmit power for each STA or station, transmit frequency or channel, or the bandwidth consumed by each user. Also, measurements taken by the Quality of Service (QoS) control, such as packet latency, packet loss, or service priority.

These measurements are sent to the decentralized controller for it to process them, communicate with the decentralized controller of other APs, and together make decisions. These decisions may entail adjustments to the physical layer of each AP. The physical layer characteristic control unit is in charge of configuring the physical layer to suit the decisions made at the network level by the decentralized controller.

The decentralized controller unit is in charge of reading the measurements taken by each access point, communicating with the access points belonging to the network, and obtaining the information necessary to configure each access point in the best way possible, in order to improve the overall operations of the wireless network, preventing possible conflicts that arise or could possibly arise, and taking measures to eliminate or reduce the impact of these conflicts.

This unit is, then, in charge of coordinating the operations of the different access points, thus achieving improvements in the overall operations of the network based on the deployment of the following methods:

1. Balance the network load, reducing interference between the APs and STAs operating on the same channel, reducing the channel occupancy time of an STA, and preventing some APs from being tied up while others have unused capabilities.
2. Select the AP to provide service to a new station STA, in order to reduce interference generated by APs and STAs operating on the same channel or on different channels.
3. Automatically configure transmission channel, in order to reduce to the minimum the amount of interference and optimize channel re-use. This process takes place automatically and starts over again when new APs join the network.
4. Automatically configure transmit power, in order to reduce to the minimum the interference caused by APs using the same transmission channel.
5. Automatically respond to failures, enabling automatic reconfiguration of the network in the event that a failure of one or more APs belonging to the network is detected.
6. Exclude based on location, made possible by prior configuring of position maps; the decentralized controller identifies STAs located outside the previously definable area of interest, and denies network access to all STAs outside this area.

Thus, the behavior of the decentralized controller is governed by a state machine, such that each access point implements said state machine.

The units called Physical Layer—Driver and QoS Control are implemented at low level and come with the operating system installed on each AP.

The hardware employed can be based on an architecture such as ARM. Alternatively, an MIPS architecture can be employed or any machine capable of supporting the compiler (GCC).

The operating system is an embedded Linux; specifically, a distribution such as Open WRT may be used.

The present invention turns the access points into intelligent access points, which are aware of everything taking place on the network at all times, and capable of continually adapting to new conditions.

DESCRIPTION OF THE DRAWINGS

As a complement to the present description, and for the purpose of helping to make the characteristics of the invention more readily understandable, in accordance with a preferred practical exemplary embodiment thereof, said description is accompanied by a set of drawings constituting an integral part of the same, which by way of illustration and not limitation represent the following.

MODE FOR CARRYING OUT THE INVENTION

Figure 1:
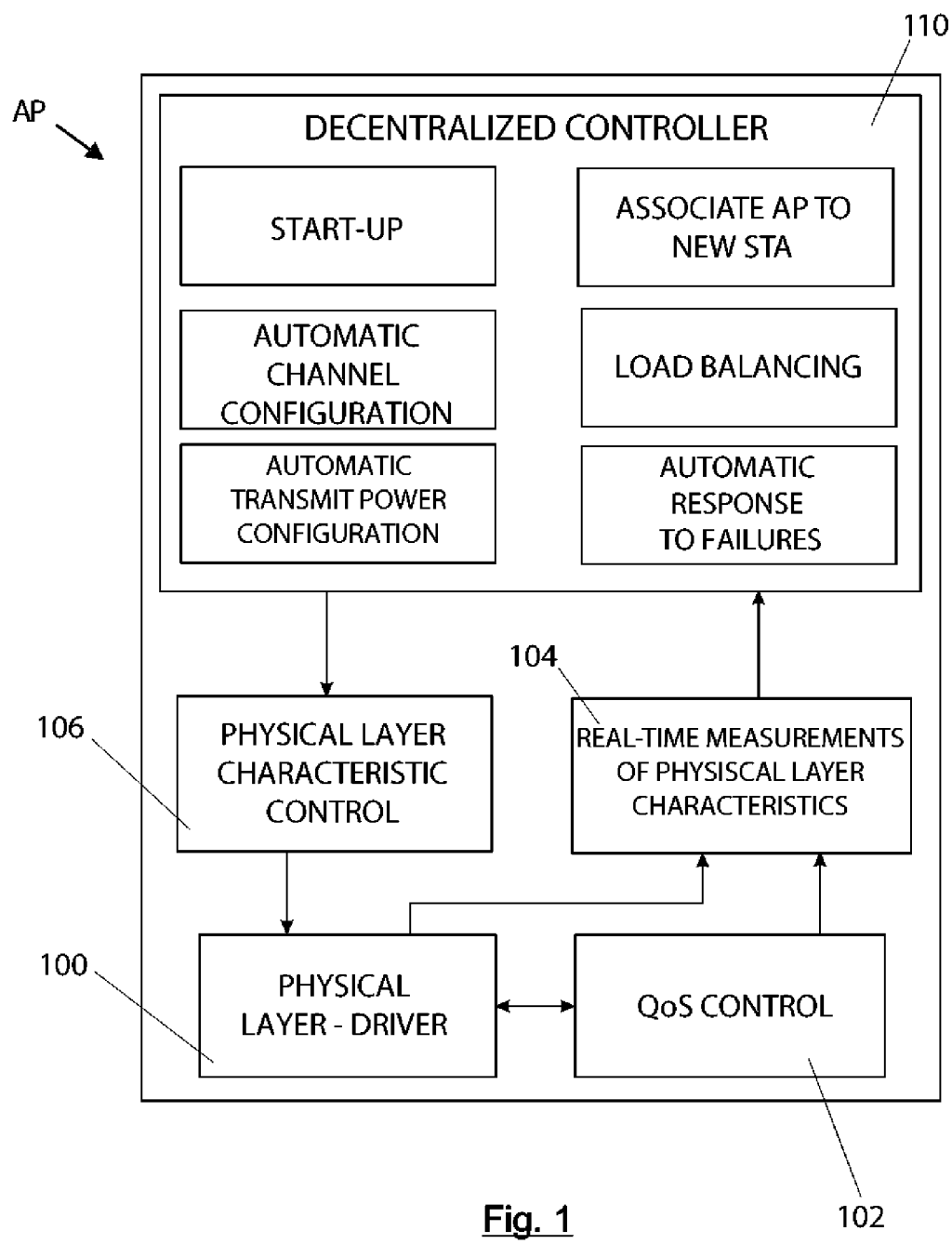
FIG. 1 shows the access point architecture in a decentralized controller network.

The present invention relates to a system for decentralized control of wireless networks, made up of a set of access points (APs). In a preferred embodiment, by way of example it may be applied in an airport. FIG. 1 shows the architecture of each access point (AP) in a decentralized controller network, which comprises the following units:

Physical layer driver (100).
QoS control unit (102).
Physical layer measurement unit (104).
Physical layer control unit (106).
Decentralized controller (110).

Figure 2:
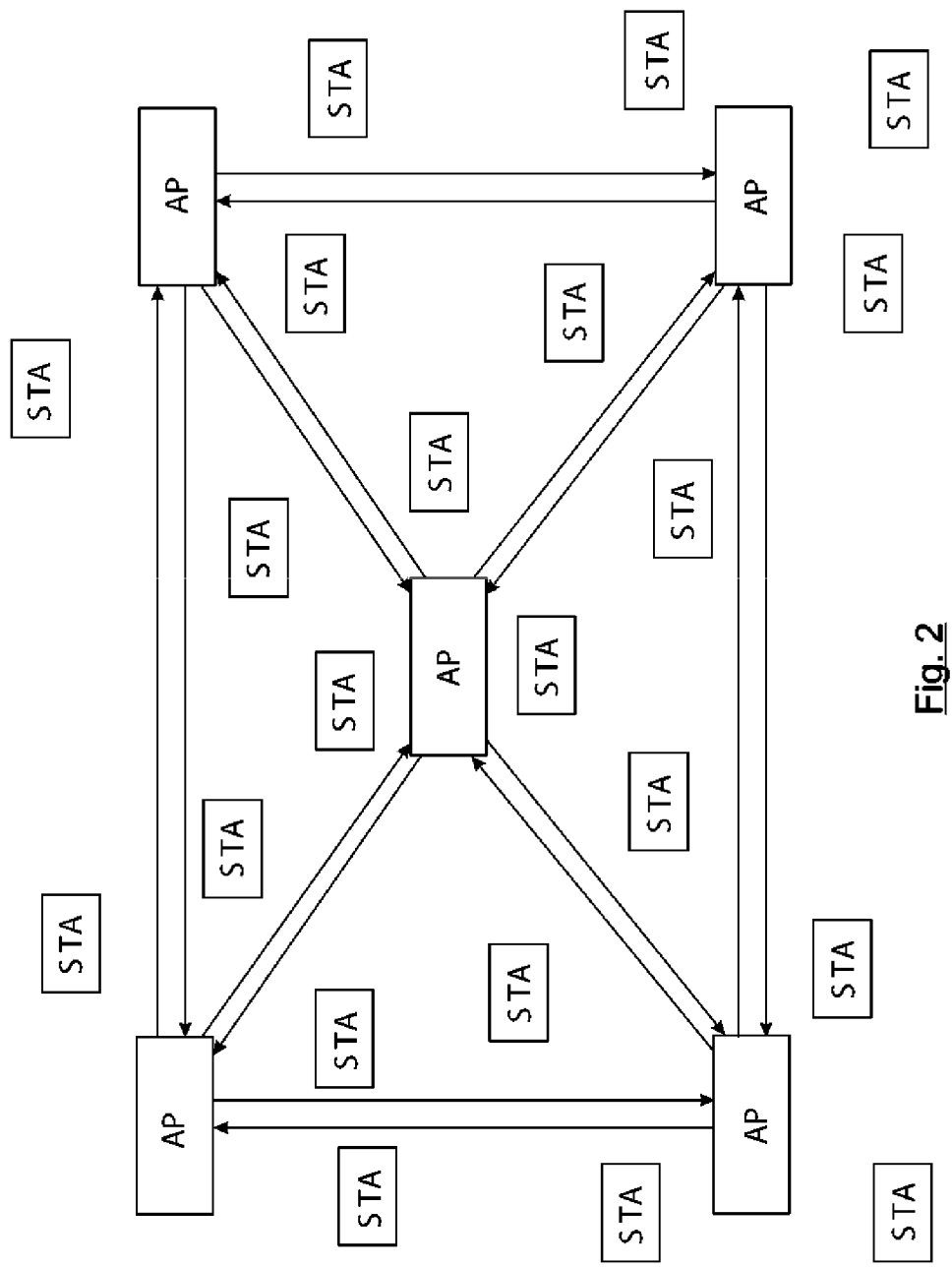
FIG. 2 represents the deployment of a network of access points with decentralized controller technology.
Figure 3:
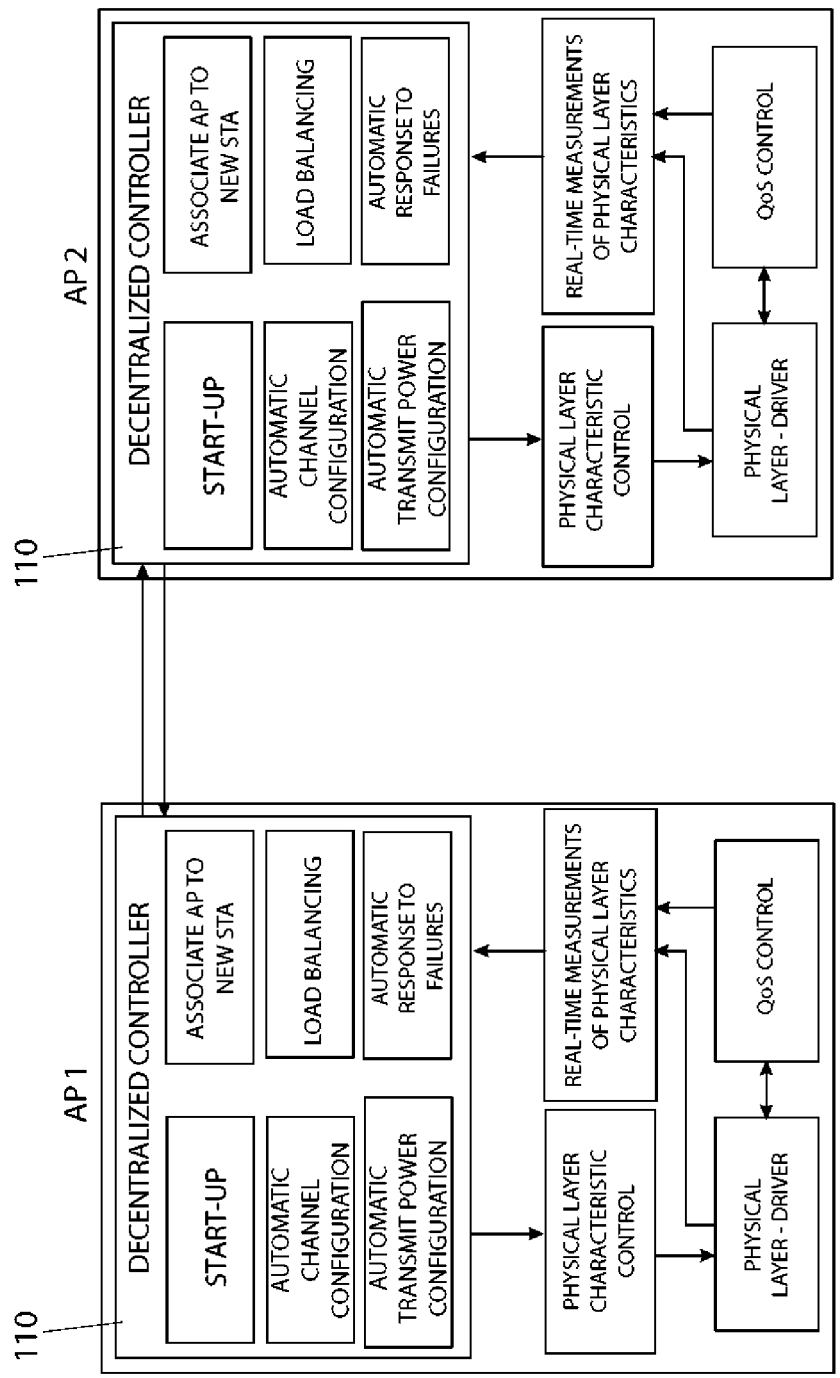
FIG. 3 represents the communication of decentralized controllers between two access points.

FIG. 2 shows the deployment of a network of access points (AP) with the decentralized controller technology. FIG. 3 shows the communication of the decentralized controllers (110) between two access points (PA1, PA2).

The physical layer driver (100) provided by the manufacturer of the wireless network card of the access point is used to read the various parameters and configure the physical layer. An existing Linux library is used for communication between the application and the physical layer driver (100). This allows both for commands to be sent and for physical layer events to be received.

A modified hostapd application is used as the base. Through the interface published by the hostapd daemon, the events occurring at the hardware level are provided, in addition to allowing commands to be sent to carry out actions such as disconnecting, disassociating and changing channel.

With respect to the QoS control unit (102), the Linux kernel offers a wide set of functions for classifying and planning network traffic. It is based on a queue tree, each of which has a specific algorithm for dequeuing packets. To facilitate configuration of said unit, the application "tcng"

(Traffic Control Next Generation) is employed. This software defines a new, more human, configuration language, providing a compiler that translates this language into a set of low-level instructions.

The main control elements are classification, enqueuing and planning. This classification consists of looking at the content of the packets and grouping them together according to the various types. The packets are then put in queues, and lastly are planned for transmission. The type of packet determines which queue the packet will go to, and what its priority is.

The "tcng" application enables monitoring of the services that are being provided to the various users or STAs, and what network resources the latter are consuming. This information is of vital importance for learning of the state of the network and the available resources, as well as problems, and for providing service in line with a previously defined service policy.

The physical layer measurement unit (104) is in charge of taking real-time measurements of the physical layer characteristics, by means of filtering and processing the information provided by tools like "tcng" or "IPTraf". The extensive information provided by "tcng" is filtered and pre-processed to obtain the parameters of interest that will enable the decentralized controller (110) to control the network and improve its operations.

The parameters monitored by this physical layer measurement unit (104) are, among others: performance, average packet latency, channel occupancy time, number of retransmissions, received power.

These measurements are presented to the decentralized controller (110) by means of a memory-mapping file. The decentralized controller (110) opens this memory-mapping file to obtain the results monitored by this unit (104).

The physical layer characteristic measurement unit (104) receives the QoS data of each connection via the aforementioned QoS unit (102).

In this way, said information passes on to the decentralized controller (110) to be used in decision making.

The physical layer control unit (106) is in charge of configuring the physical layer based on the commands sent by the decentralized controller (110).

This unit (106) is able to vary the transmit power and the transmission channel, as well as parameters such as traffic control, quality of services and traffic priority.

In terms of each state machine implemented by each access point (AP), the decentralized controller (110) can be divided into two distinct blocks. The first corresponds to the start-up process, and the second is centered on monitoring the resources themselves, acting in response to different variations produced in its environment, and tending to the requests of other devices.

Figure 4:
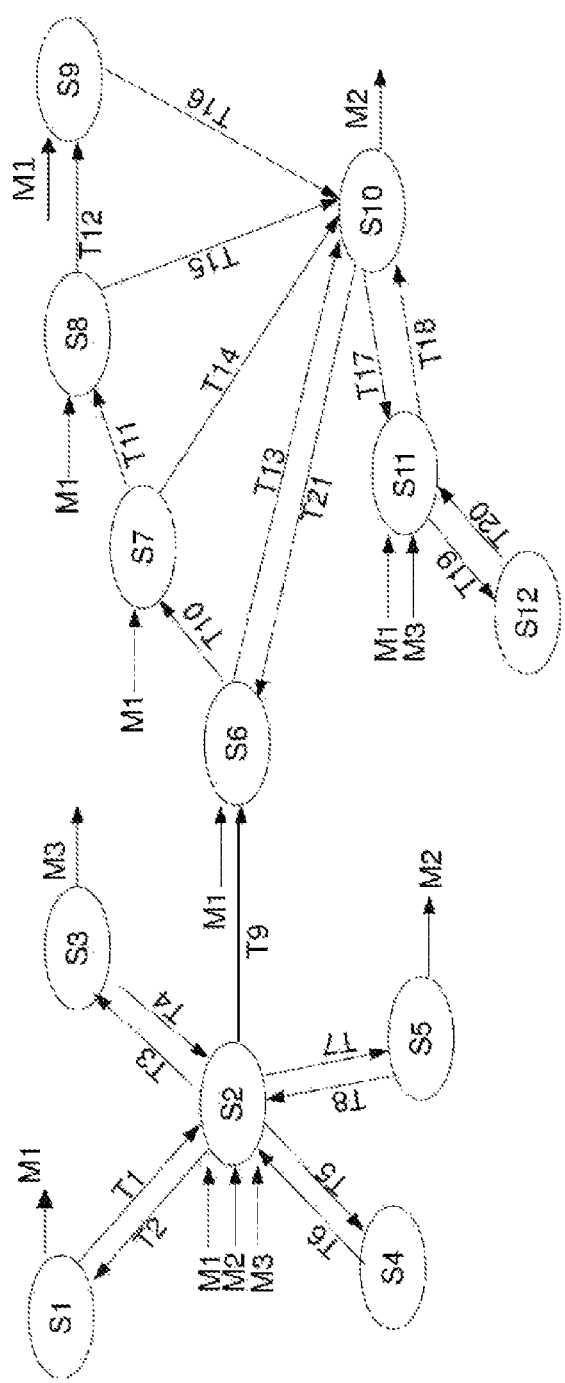
FIG. 4 shows the state machine of the decentralized controller launching process.

FIG. 4 shows the state machine of the decentralized controller launching process. The aim of the start-up process is for all of the access points in the same network to be aware of each other's existence, and to reach a consensus on the choice of the keyword that will be used to encrypt the messages thereafter.

The state machine of the launching process can be divided into 2 distinct parts:
 Part 1: when the access points or nodes belonging to the network are launched. This part comprises from the time the access point (AP) is launched, i.e. the Start-Up state, to when the AP reaches the Standby state, in which it remains while waiting to receive messages. This part comprises from state S1 to state S9 in FIG. 4.
 Part 2: when the access points are in the Standby state and receive notification from one or more access points that wish to join the network. This part comprises from state S9 to state S12 in FIG. 4.

FIG. 4 shows the behavior model of the system in the launching process. States (S1, S2, . . . ) and transitions (T1, T2, . . . ) are detailed below:

| State/Transition | | Comment |
| --- | --- | --- |
| S1 | Start/Send notification | When an access point (AP) joins the network, the first step is to send message M1, "Switch-on notification", to let the other members of the network know that a new participant has just joined the network. M1 contains an ID for the AP that is unique and unrepeatable. This ID helps to unambiguously distinguish between the APs on the network. |
| T1 | | After sending M1, the AP transitions to S2 |
| S2 | Wait | In this state, the AP waits for a message. Several types of messages can be received in this state: M1, M2 or M3. The AP is in charge of filtering the messages by type and addressee |
| T2 | | Once time "t1" has elapsed without receiving any messages, the AP returns to the previous state S1 to resend message M1. This process is repeated a maximum number of "n1" times. |
| T3 | | When message M2, "Confirmation of switch-on" is received, the AP transitions to S3. |
| S3 | Reply received | In this state, the AP sends message M3, "Consent", to consent to the receipt of M2. |
| T4 | | Automatic transition after sending M3. |
| T5 | | Message M3 is received. |
| S4 | Consent received | The AP processes M3 and eliminates it from the message queue. |
| T6 | | Transition after carrying out this action |
| T7 | | The AP receives an M1 message. |
| S5 | Notification received | The AP sends a M2 message as a reply. |
| T8 | | Transition after sending M2. |
| T9 | | Once time "n1 * t1" has passed, transition to S6. |
| S6 | Generate key | In this state, all of the APs that have given notice of their existence agree on the key for encrypting the information sent between the APs belonging to the network. To generate the shared key, the well-known Diffie-Hellman method for exchanging cryptographic keys is used. |
| T10 | | After generating the key, the APs transition to S7 |
| S7 | Channel selection | In this state or group of states, the APs agree on which channel each AP belonging to the network should use. This process is described in detail in a separate state machine (FIG. 5). |
| T11 | | After carrying out the channel selection, the APs move on to S8. |
| S8 | Power selection | In this set of states the APs work together to establish the transmit power to be used by each AP. This process is described in detail in a separate state machine (FIG. 7). |
| T12 | | Lastly, the APs move on to state S9, "Standby". |
| S9 | Standby | The AP awaits events/messages. |
| T13/ T14/ T15/ T16 | | The AP receives an M1 message from a new AP that wants to join the network. |
| S10 | New notification AP | The AP sends a M2 message. |
| T17 | | The AP transitions to S11 |
| S11 | Await additional notifications | The AP waits for time "t2", awaiting notifications from other potential APs that wish to join the network, before moving on to S6. |
| T18 | | While in S11, the AP receives an M1 message; the AP transitions to S10 to reply. |
| T19 | | While in S11, the AP receives an M3 message. |
| S12 | Consent received | The AP processes the consent and eliminates it from the message queue. |
| T20 | | Automatic transition |
| T21 | | Once time "t2" has passed after receiving the last M1 message, the AP transitions to state S6, wherein a new shared key is generated, including the new APs that have joined the network. |

After the network launching process has finished, the network is ready to operate and provide service to the different users or STAs. The access points belonging to the network have been identified and have gotten in contact with one another, the shared secret key for encrypting the messages between the APs has been generated, the transmission channels have been assigned to the various APs and the transmit power of the various APs has also been established.

Below, the processes encompassed by states S7 and S8 are described, which correspond to the automatic channel selection process and the automatic transmit power selection process, respectively.

Figure 5:
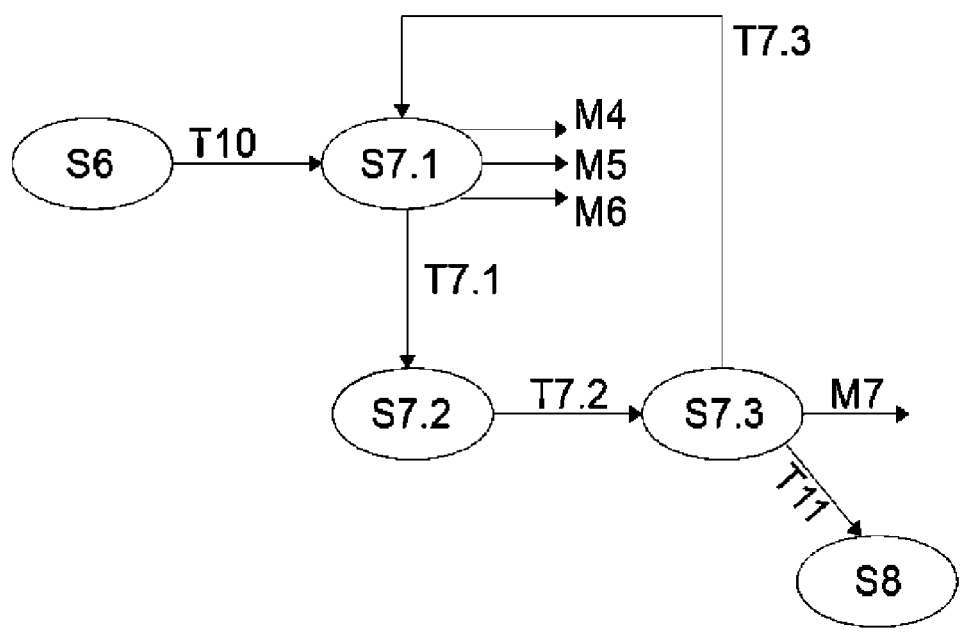
FIG. 5 represents the state machine of the automatic channel selection process.

FIG. 5 shows a state machine of the automatic channel selection process. This state machine models the business logic that controls the choice of the emission channels of each access point (AP) belonging to the network during the launching process.

The aim of this process is to minimize the interference in the operating environment of the network, including interference with neighboring networks, as well as internal interference between the access points that make up the network. This state is encompassed by state S7, "Channel selection", in the launching process.

In a network with several access points operating, the access points agree on which channels to use for each access point in the network. The channels are assigned according to what is best for the network as a whole, not for one access point in particular. Furthermore, in large networks channels are reused, and the reuse patters are assigned in a coordinated fashion. The decentralized controller (110) optimizes channel selection with time, improving the quality of service offered and minimizing interference with neighboring networks.

For automatic channel selection, the decentralized controller (110) acts based on the network structure information gathered by each access point (AP). Said information consists in forming a neighbor vector with the access points whose transmitted beacons are received, with the power received and the relative location. It is transmitted to all nodes in the network so that each access point has all of the data necessary to choose the very best channel, without needing to request more information from other nodes in the network.

The next step is to carry out a pre-selection using the channel survey algorithm to select which channel is least occupied for transmitting. Then the result obtained is spread to the various nodes in the network. At this point, the access points (AP) are ready to calculate the channel configuration for each one that best minimizes interference between them.

Figure 6:
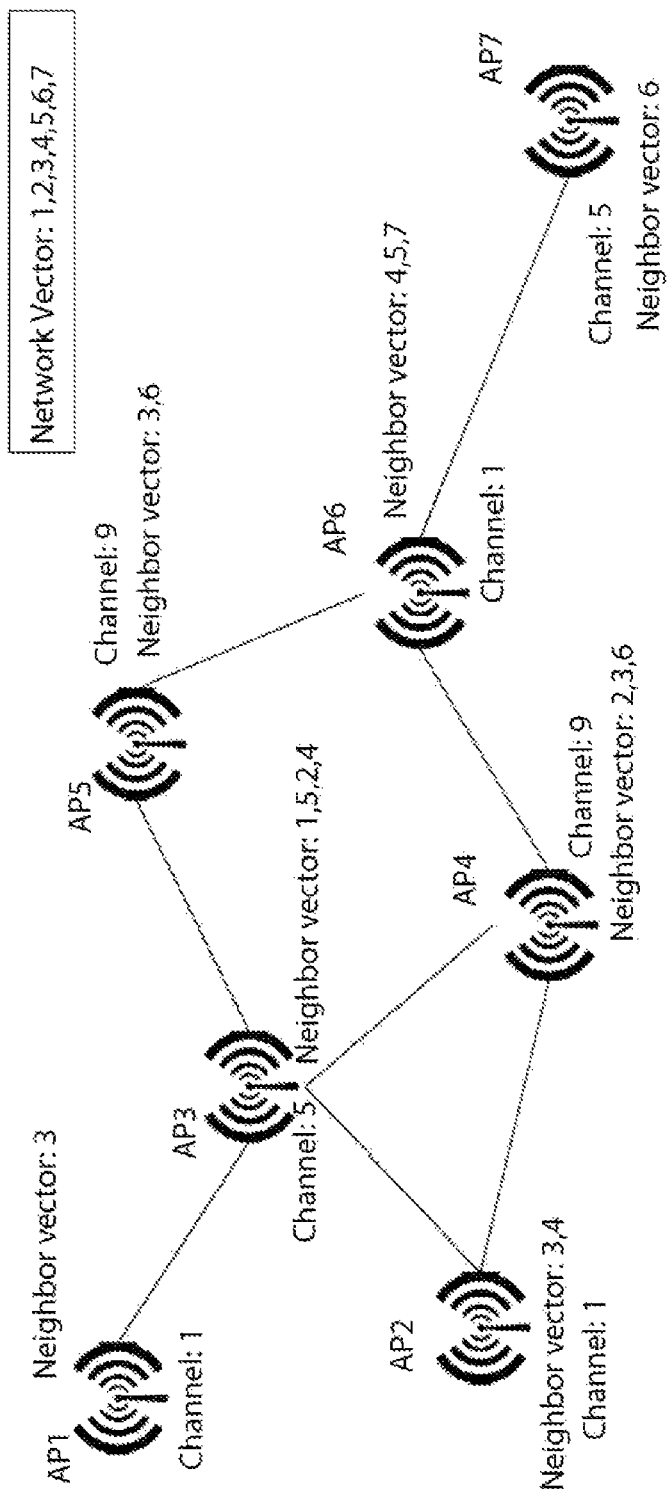
FIG. 6 shows a network visibility graph.

FIG. 6 shows an example of network diagrams showing the access points belonging to the network: AP1, AP2, AP3, AP4, AP5, AP6 and AP7. The line between two access points represents the fact that these two access points are within range of reach, meaning they can hear each other, and as such, can interfere with each other. This information is collected in the Neighbor Vector (NV). In this way, the neighbor vector of access point AP3 is (1, 5, 2, 4). The Network Vector (NetV) represents the list of access points belonging to the network. This information, network vector (NetV) and neighbor vector (NV), as well as the power with which the signals of all the neighbors are received, is what is used for selecting the transmission channels and assigning them to the access points.

The state machine that controls the behavior described is shown in FIG. 5, whereas the following table describes the states and transitions that take part in channel selection.

| State/Transition | Comment |
| --- | --- |
| S7.1 | Scan Neighbors | In the previous states, it has been determined which APs make up the network and what their identifiers (or IDs) are. When the APs transition to S7.1 all but one of the APs, for example the one with the lowest ID, begin to transmit beacons (M4) with the channel and power assigned by default at launch. The one with the lowest ID begins to scan for as long as it takes to complete scanning, up to a maximum of t3 (configurable), to detect the M4 messages of its neighbors and other surrounding external networks. Once it has all the information, it stores it and informs the rest of the APs of the result by means of message M5, "Neighbor Vector (NV)", which contains all of the APs of its own network, along with the power with which it has received their M5 messages; it also sends message M6, "list of preferred channels". M6 contains the list of channels on which the AP can operate in order of preference. Thus, for example, an AP operating just on the 2.4 GHz band can send a list such as: (3, 2, 6, 11, 1, 9, . . . ). This indicates that its preferred channel to operate on is 3, followed by 2, followed by 6, and so on. M6 obtains this by measuring the powers received from the beacons belonging to the external networks and estimating the level of interference on each possible channel. Sending out messages M5 and M6 indicates that scanning is complete and also indicates the results thereof. The result communicated in M5 contains which neighbors, with what power, an AP detects through its wireless interface. In this neighbor vector are identified both the APs belonging to our own network, as well as those belonging to external networks that are unrelated to the decentralized controller. Subsequently, another AP from the network, for example the AP with the second-lowest ID, begins to scan. This enables the APs to begin detecting the presence of other members in the network and to estimate the power with which it detects them. Once the last AP in the network has sent out its M5, the APs transitions to S7.2. |
| T7.1 | | After receiving all of the M5 and M6 messages from the APs registered in the Network Vector, each AP transitions to state S7.2. |
| S7.2 | Channel selection | When the AP transitions to this state it knows the following information:<br>The NetV indicating the APs that are members of the network<br>The NV of each AP in the network, including the powers with which each AP sees its neighbors<br>The list of preferred channels of each AP in the network.<br>At this point, the information stored in each AP is identical, since each AP has collected the messages of all the other members of the network. This is the strength of the distributed controller. In this way, each AP implements the automatic channel selection method locally. This method calculates the channels that should be assigned to each AP to maximize the overall operations of the network, minimizing interference.<br>The criteria used in this state are:<br>Minimize interference between APs belonging to the network<br>Minimize interference with networks or devices external to the network<br>Reuse and take advantage of the available channels in the deployment of a specific network.<br>Once the AP has computed the channel selection for all of the APs in the network, it is broadcast by sending out message M7, "Channel selection". This message is used by |

| State/Transition | | Comment |
|---|---|---|
| | | the rest of the APs belonging to the network in order to verify that there are no discrepancies between the information that they themselves have calculated locally, and that which the rest of the APs in the network have communicated. The method used to carry out the channel selection based on the information collected, is explained in more detail further on. |
| T7.2 | | Once the AP has locally computed the channel selection for the whole network, it transitions to state S7.3. |
| S7.3 | Configure channel | In this state, the AP receives all of the M7 messages from the other APs in the network, and verifies that they have all reached the same conclusion. Once this has been verified, it assigns its transmission channel to the corresponding channel. |
| T7.3 | | If any one of the APs does not have the same calculations as the rest, it follows the majority decision. Should there be a tie, or all-around discrepancy, the channel selection process starts over. |

At any time during the automatic channel configuration process, a notification can arrive that a new AP wants to join the network (message M1). In this case, the process is interrupted, and there is a transition to state S10.

Figure 7:
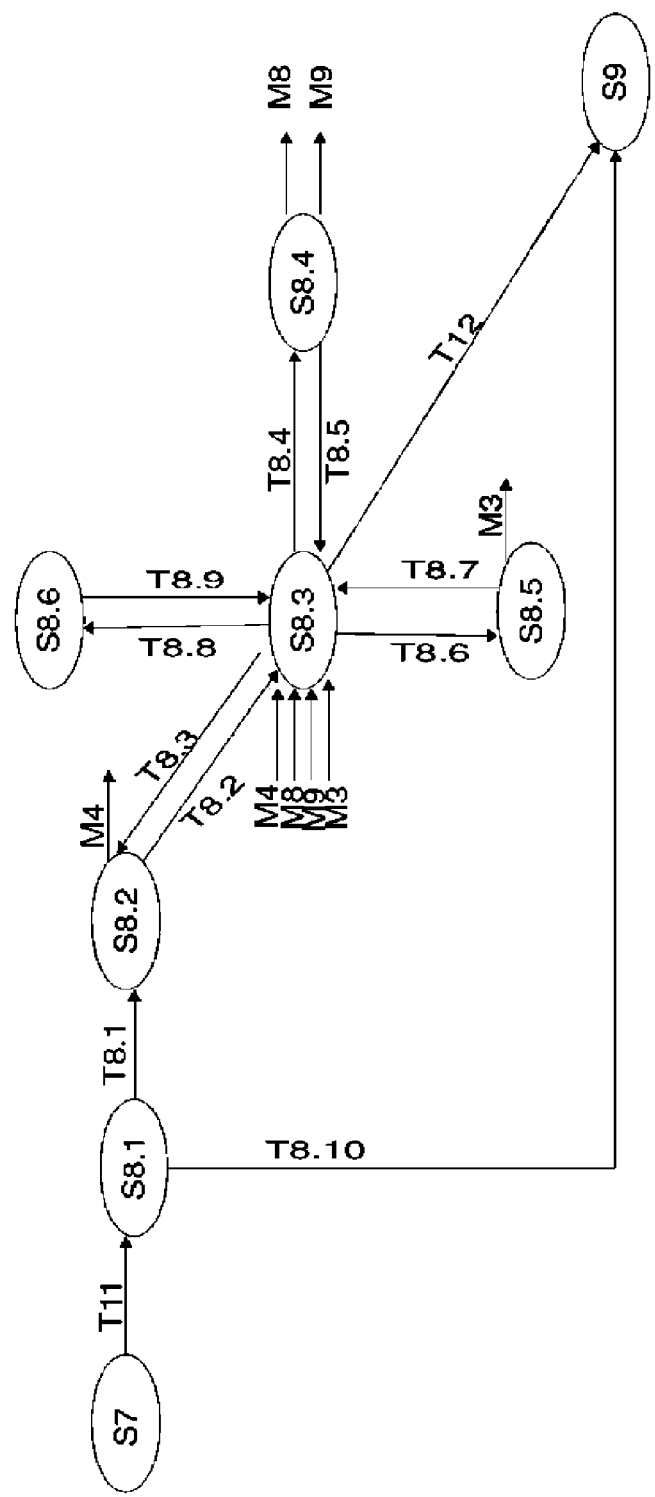
FIG. 7 shows the state machine of the automatic transmit power selection process.

FIG. 7 shows the state machine that models the behavior of the automatic transmit power configuration process. In the preceding process, the access points select the transmission channels with the aim of reducing as much as possible the interference between access points of the same network, as well as interference with devices that are external to the network. This selection is not easy, especially when there is a high number of APs in a limited area, as only a limited number of channels are available. Because of this, even with the most optimal channel selection, high levels of interference between access points can still occur.

The main aim is to decrease the interference between access points that emit at the same frequency and have direct visibility. State machine S8 models the behavior of the system in order to reach a mutual understanding between two or more adjacent cells, which, due to the low number of decoupled channels provided by standard 802.11, use the same emission channel, or another whose spectra partially overlaps it.

First of all, it must be determined which neighbors are emitting on channels that produce interference with the access point. This is carried out by means of the neighbor vector, which has been generated previously in the state machine of the automatic channel configuration process. Subsequently, a power reduction message is sent out, with the minimum value by which the driver will accept to reduce the transmit power. Upon receiving said message, the access points establish a new power level and carry out a new power measurement to check whether the new value fulfills the necessary requirements. If this is not the case, the process starts over, further reducing the transmit power until reaching a signal to noise value above a minimum level that allows for proper network operations.

Figure 8:
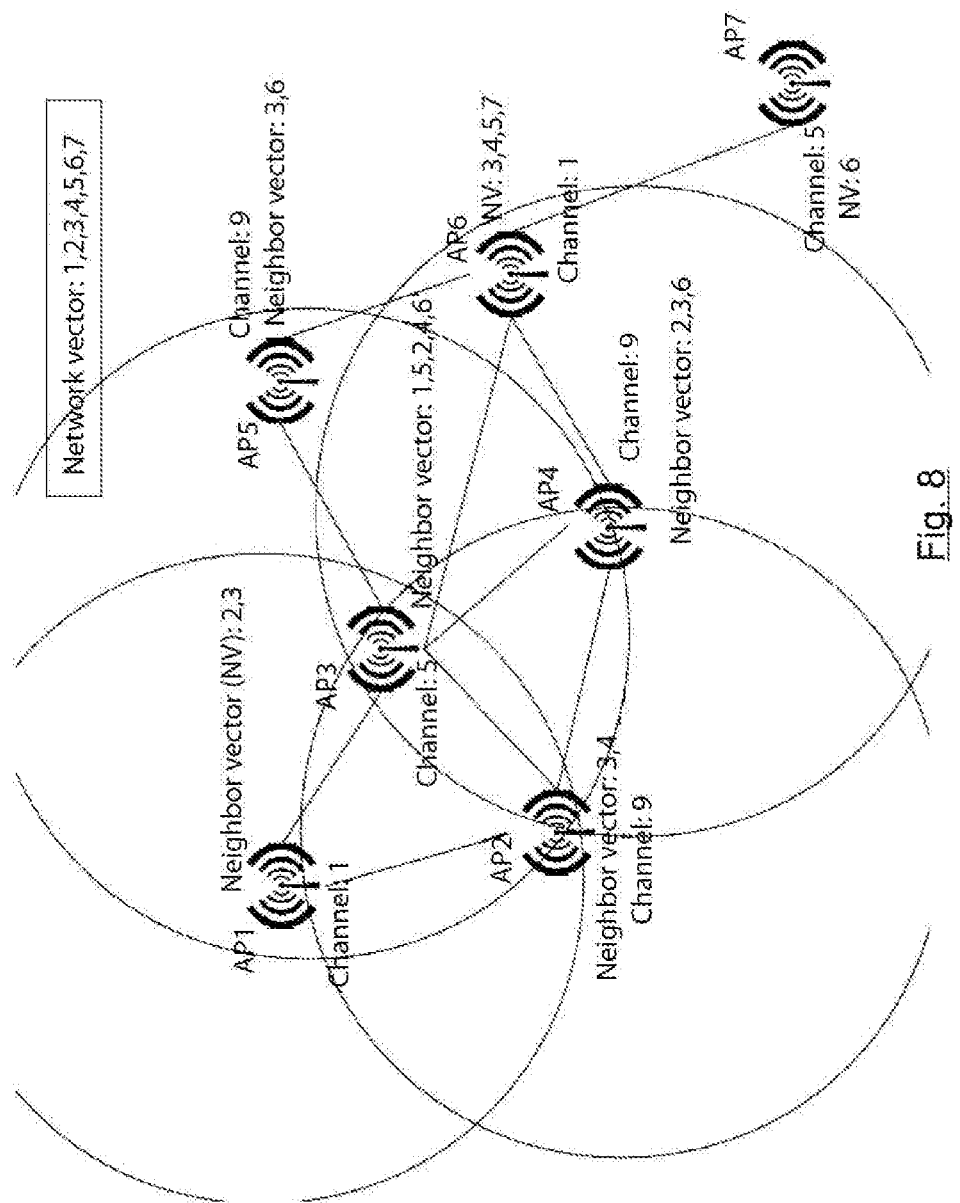
FIG. 8 shows a coverage diagram of the access points making up the network.

FIG. 8 shows a coverage diagram of the access points making up the network, which explains how the process operates, and in which access points AP2 and AP4 are causing mutual interference because they are both using the same emission channel. If, for example, that there are only three non-overlapping channels available for network deployment (channel 1, channel 5 and channel 9), then it is physically impossible to select another channel for access point AP2 that will not overlap with some other neighboring access point. As such, the two conflicting nodes send out a power reduction request packet. Power is reduced until reaching an acceptable noise threshold. This threshold is defined by the decentralized controller (110), and is configurable.

Figure 9:
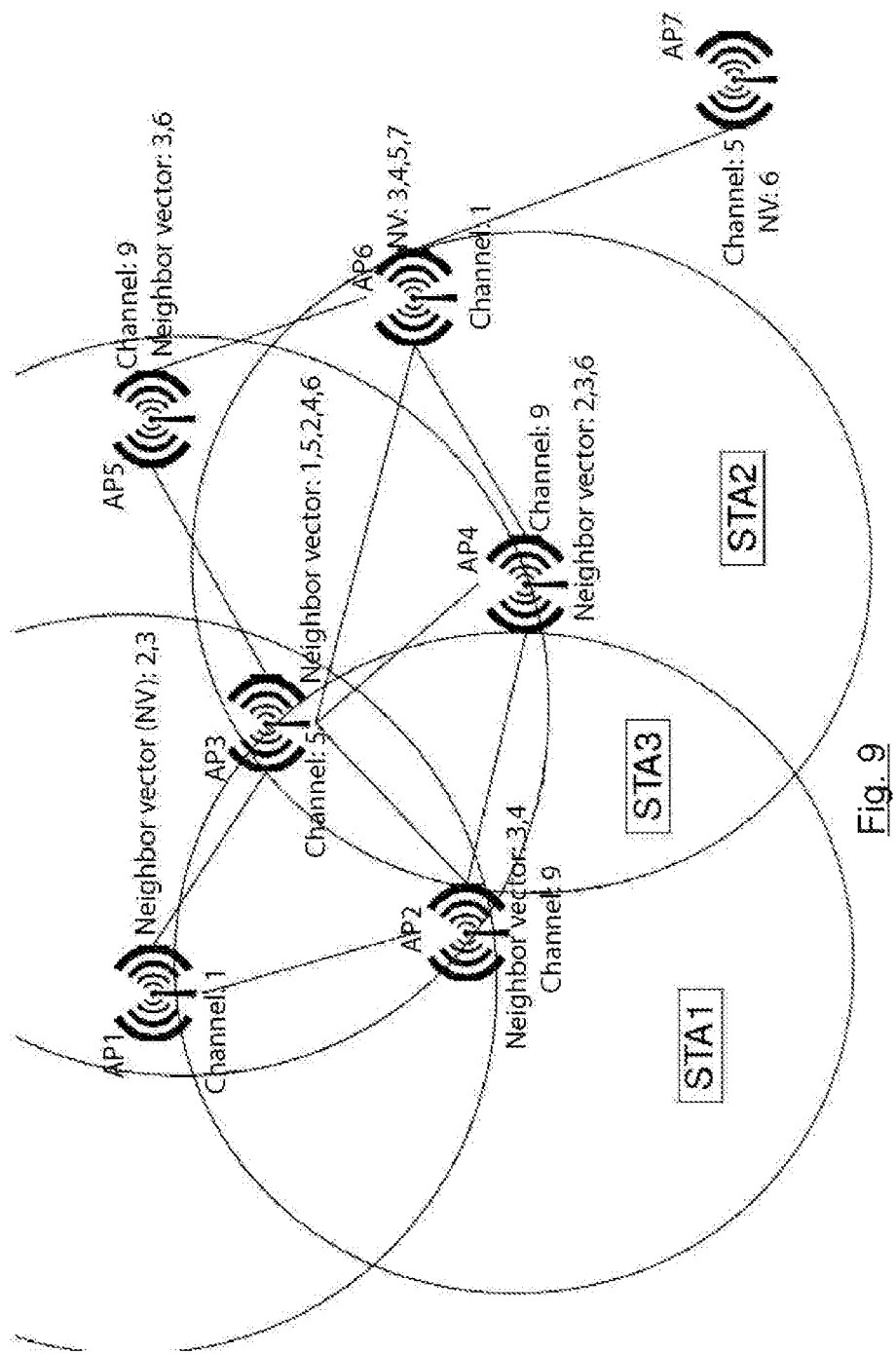
FIG. 9 shows a coverage diagram of the access points after lowering transmit power.

To calculate the acceptable noise level, the access point determines the amount of noise it can handle and still continue to communicate with its STAs. In FIG. 9 it is possible to see the effect at the end of said transmit power reduction process.

It is important to note that this process only starts if there is a potential for direct interference between two access points that use the same transmission channel.

As illustrated in FIG. 9, the immediate advantage of making this power correction is that it reduces the interference arising when station STA1 communicates with access point AP2 at the same time that access point AP4 is transmitting packets to station STA2. The reception of packets at access point AP2 will have a higher power than the reception of interference emitted by access point AP4, and so access point AP2 will be able to decode the signal of station STA1.

As shown in FIG. 9, by reducing the transmit powers of access points AP2 and AP4, communications between station STA1 and access point AP2, and between station STA2 and access point AP4, can take place simultaneously without entering into conflict. Before the powers were adjusted to the new value, there was a conflict when access point AP2 was receiving packets from station STA1 at the same time that access point PA4 was transmitting packets to station STA2, and vice versa, when access point AP4 was receiving and access point AP2 was transmitting.

There is still a conflict when a client (station STA3) is in the area with coverage from access points AP2 and AP4, both of which use the same channel or frequency (channel 9 in the example). The solution to this problem comes in a subsequent process, and once the access points are already in Standby state.

The aforementioned FIG. 7 shows the state machine that models the behavior of the described process, whereas the following table describes the states and transitions that take part in channel selection:

| State/Transition | | Comment |
|---|---|---|
| S8.1 | Determine conflicts | In this state, the AP searches through its list of neighbors for the channel assigned to each one of its neighbors and verifies whether any of them has the same channel or a channel that partially interferes with its own transmission channel. |
| T8.1 | | If any conflicts are detected |
| S8.2 | Transmit beacons | The AP transmits message M4, "Beacon", at the maximum power assigned to it. This is done in order to allow the neighboring stations that are involved in this process to be able to measure the power with which they receive this "Beacon" message |
| T8.2 | | The AP transitions to state S8.3 to wait to receive messages. |

-continued

| State/Transition | | Comment |
| --- | --- | --- |
| S8.3 | Wait | The AP waits to receive messages. It can receive the following messages from one of its neighboring stations:<br>M4 "Beacon"<br>M8 "Reduce transmit power"<br>M9 "Transmit power acceptable"<br>M3 "Consent" |
| T8.3 | | If it receives an M8 message, the AP reduces its transmit power by the amount indicated in the message, and transitions to state S8.2, from which it resends the "Beacon" message with the new adjusted power. |
| T8.4 | | If it receives an M4 message, the AP moves on to state S8.4. |
| S8.4 | Measure and indicate | The AP measures the power with which it receives the "Beacon" message and verifies whether this power surpasses its permitted noise threshold.<br>If it does surpass it, it sends an M8 message.<br>If it does not, it sends an M9 message |
| T8.5 | | The AP returns to state S8.3. |
| T8.6 | | If it receives an M9 message, the AP transitions to S8.5. |
| S8.5 | Acceptable power | The AP consents by sending an M3 message |
| T8.7 | | The AP returns to S8.3. |
| T8.8 | | If it receives the message M3, the AP transitions to S8.6. |
| S8.6 | Consent received | The AP processes the message and eliminates it from the message queue |
| T8.9 | | The AP returns to S8.3. |
| T11 | | Once the AP has sent an M9 message to each one of the APs that were causing the conflict, and has also received an M3 that its transmit power is suitable, the AP transitions to S9 (Standby). |

At any time during the automatic transmit power configuration process, a notification can arrive that a new AP wants to join the network. In this case, the process is interrupted, and there is a transition to state S10.

The greater the number of APs belonging to the network, the longer the network start-up process, especially with the calculations made at S7 and S8. To avoid having to repeat the process with each launch, after an initial launch, a network configuration file is generated and stored in each AP, indicating the channel and maximum power assigned to each AP. At launch, each AP verifies the existence of said configuration file. If it does exist, the AP configures to the channel and power defined in said file. In this way, the launch process is accelerated. The configuration file can have a configurable expiration time so as to periodically force the network to reset.

Once the access points are in Standby, they can begin accepting user or STA connections. This process of accepting connections opens up a new range of processes, which are explained below.

Till now, the processes and state machines that take part in the launch process have been analyzed. During this process, the access points identify themselves on the network, generate the shared secret key for encryption, exchange information about what they can see of the network, make an automatic selection of the channels to be used on the network and of the maximum transmit powers for each access point belonging to the network.

Now the mechanisms that take part in optimizing the network once the access points are on Standby are described. The access points start from state S9, "Standby", in which they remain while waiting for events or messages.

Once the access points are in Standby state, they can accept connections from STA stations or network users.

Below, the different state machines that take part in the processes in Standby are described:

S13 "New STA connection process", state machine that contains the steps and messaging necessary to assign an access point to a new STA station that requests to connect to the network.

S14 "Load balancing process", state machine that contains the steps and messaging necessary to select an STA station that is a candidate to be transferred to another access point.

S15 "Automatic response to failures process", state machine that contains the steps and messaging necessary to detect and repair failures in the network interfaces of the access points.

S16 "Transmission channel optimization process", contains the steps and messaging necessary to optimize the initial assignment of the transmission channel by means of network statistics gathered over the course of its operations.

The state machine of the new station (STA) connection process describes the process followed by a new station (STA) or user who tries to connect to the network made up of a set of access points, or when a station (STA) roams from one network or access point (AP) to another. The access points are on Standby (S9). The aim is to assign the access point (AP) that is a candidate to provide service to a new station (STA), with the aim of minimizing interference on the network or with neighboring networks. This process uses passive and active scanning, as well as measuring the environment of the network in order to make the decision and assign the optimal access point (AP).

When a station (STA) wants to join a new network or when it wants to roam to another network, it scans to see what networks are available in its environment. There are two possibilities when carrying out a scan:

1) Passive scan. The access points (APs) periodically send out beacon frames (typically 10 times per second). These beacons are used to announce their presence and make it easier for potential stations (STAs) in the area to detect the access point (AP). In passive scanning, the station (STA) listens in to receive the beacon frames available in its environment. It evaluates these frames and decides which network to connect to by sending out an authentication request, which corresponds to the 802.11 message, "Authentication Request Frame". This process is slow, as the station (STA) has to tune each channel and wait to receive a beacon.

2) Active scanning or probing. The aim of this process is to accelerate the passive scanning process. The Probe Request frame is available for this purpose. When a station (STA) wishes to connect to a new network, instead of waiting to receive the beacon messages, it sends a Probe Request frame over each channel. When an access point (AP) receives a Probe Request, it responds with a Probe Response, thus indicating its presence. Once all of the Probe Responses have been received from the various access points (APs), the station (STA) decides which access point (AP) it will send its Authentication Request Frame to.

In both passive and active scanning, it is the station (STA) that decides which access point (AP) it will send its association request to. This is what we call client-oriented access.

The present invention proposes a new station (STA) connection process wherein the access points (APs) use passive scanning, active scanning and measurement of the environment to compile information on which access points (APs) detect the new station (STA), and likewise, which access points (APs) are detected by the new station (STA).

The information that is collected is, among others:
Channels supported by the station (STA).
Data rates supported by the station (STA).
SNR, RSSI or power received with which each access point (AP) receives the Probe Requests, or the authentication or new station (STA) association messages.
Whether the station (STA) is already associated with an access point (AP).
As well as other optional parameters, such as HT support, channel utilization.

With this information, the network decides which access point (AP) is the best candidate to provide service to the new station (STA). The aim of the selection is to minimize the interference generated in order to provide service to this new station (STA), as well as to balance the total network load. When assigning the access point (AP) to a new station (STA), load balancing has a lower priority than minimizing interference.

To get the station (STA) to connect to the candidate access point (AP) and not to another one, the following action is carried out:
1) Passive scan. The access point (AP) that receives the authentication request from the new station (STA) does not reply. Thus, it waits for the station (STA) to try again with other access points (APs) in its environment until receiving a response.
2) Active scan. The access point (AP) that receives the Probe Request frame does not reply. Thus, the station (STA) will continue to send out Probe Requests on other channels until receiving a response.

As a result, the access points (APs) go about gathering information on which access points (APs) detect the new station (STA), and with what power. Once enough information has been obtained, the access point (AP) that is best able to provide service to this station (STA) is selected, and it is this access point (AP) that will reply to the association request (passive scan) or Probe Request frame (active scan).

In addition to the active and passive scans, there is the possibility of requesting that a station (STA) take measurements of the radio environment, specifically about what stations it detects and with what powers. This has been defined as a complement to standard 802.11, described in amendment 802.11k: "Radio Resource Measurement of Wireless LANs". 802.11k has been officially incorporated into standard 802.11. Because this incorporation is relatively recent, not many stations (STAs) on the market implement it yet.

However, to take advantage of the stations (STAs) that do support it, as well as for future operations, the present invention includes alternative measures to the active and passive scan, so as to thus obtain the list of access points (APs) detected by a station (STA).

In this process, information is obtained about the station (STA) that has requested to join the network. With this information, its visibility of the network is determined, meaning which access points (APs) can detect the new station (STA) and with what power, or, alternatively, which access points (APs) are detected by said station (STA).

Once this information has been obtained, the access point (AP) that is the best candidate to provide service to the new station (STA) is selected. The first and foremost criterion is that there be no interference with another access point (AP) in the network. In this way, if the station (STA) is detected by two access points (APs) that operate on the same channel, it is necessary to prevent one of them to provide service, which would cause interference in both networks and reduce capacity thereof. Nevertheless, received power or SNR are also important. Too low of an SNR would make the connection too slow, as any given SNR has a maximum data rate assigned by 802.11. If the SNR is very low, the data rate of the station (STA) will be very low, and so the station (STA) will need more time to transmit its data, occupying the channel for a longer period of time. For this reason, the second criterion is the SNR. The third criterion is the network load. If from the first and second criteria (interference and SNR) it is concluded that access point AP2 is the best candidate, but that said access point AP2 is congested whereas the rest of the access points (APs) are idle, this would not be the right decision either. Network balance, then, is also an important piece of information to take into account.

The method thus orders the list of access points (APs) that detect the station (STA) following these 3 criteria:

The first step is to obtain which access point (AP) receives the station (STA) with the best SNIR (Signal-to-Noise and Interference Ratio). The SNIR indicates whether the quality of the signal is compromised by both ambient noise and by interference.

Thus, this ordering takes into account the first and second criteria. To this end, the SNIR with which each access point (AP) detects the station (STA) is calculated, or vice versa, should the station (STA) support standard 802.11k (for the sake of simplicity it may be assumed that the information is similar and that both lead to the same result). This is based on the received power, the received interference and ambient noise.

The access points (APs) must be ordered so as to find out which one can best provide service to the station (STA), keeping in mind the first and second criteria. Ambient noise (N) can be measured by each access point (AP) and will depend on each environment. Typically, its values will be in the region of less than −90 dBm.

To obtain the SNIR for each access point (AP), the following formula is used:

$$SNIR_i(\text{dB}) = P_i(\text{dBm}) - 10 * \log\left(\frac{\left(\sum_{\forall j \neq i, j \in I} P_j(\text{mW})\right) + N(\text{mW})}{1 \text{ mW}}\right)$$

where "$SNIR_i$" is the signal-to-noise and interference ratio for access point "$PA_i$",
"$P_i$" is the received power of the messages sent by a station (STA) for each AP en dBm,
"I" is the set of access points (APs) that transmit on the same channel as "$P_i$",
"$P_j$" is the power received by access points (APs) on the same channel as "$PA_i$" in mW,
and "N" is the ambient noise or thermal noise in mW.

Thus, the SNIR for each access point (AP) can be obtained, choosing the one whose SNIR is higher than the rest. This ordering makes it possible to detect potential hidden nodes in the network, since, if two access points (APs) operating on the same channel detect the station (STA), which means that if one of the two access points were to provide service to the station (STA), this would cause interference with the other access point and the stations (STAs) associated thereof. The SNIR assigned to both access points (APs) will normally be lower than an access point (AP) that does not have interference for that station (STA). By this means, the possibility of hidden nodes appearing is reduced.

The last step is to verify that access point AP2 has the ability to receive the new connection. This is done by checking that the load of access point AP2 does not surpass a certain threshold. If such is the case, access point AP2 accepts the connection request from the station (STA).

Figure 10:
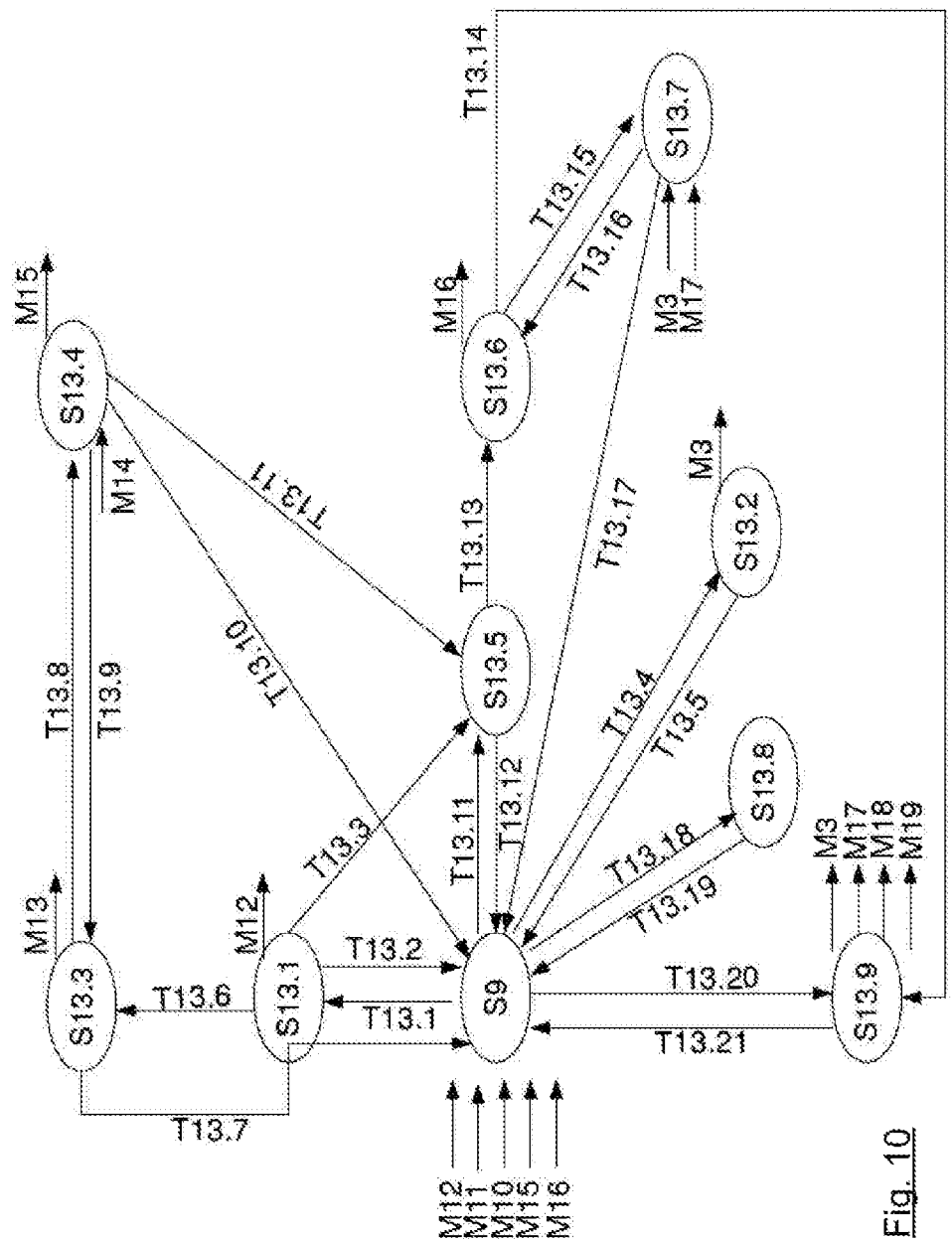
FIG. 10 represents a state machine of the new station connection process.

FIG. 10 shows the state machine of the new station (STA) connection process. The following table describes the states, messages and transitions that take place when a new station (STA) attempts to join the network:

| | State/Transition | Comment |
|---|---|---|
| S9 | Standby | When a new STA wants to connect to a network made up of a set of one or more APs, the process of scanning the available networks starts. As mentioned previously, the STA can carry out two types of scan:<br>1) Passive scan. In this case the message that the AP receives is M10, network "Authentication Request" (from 802.11, "Authentication Request").<br>2) Active scan. In this case the message that the AP receives is M11, "Probe Request".<br>When an AP receives one of these 2 messages it transitions to state S13.1.<br>It is important to note that the AP does not respond to the STA for now; it uses the request from the STA to gather information about its power and share it with the other APs in the network. |
| T13.1 | | The AP receives a message from the STA and transitions to S13.1 |
| S13.1 | Obtain and share STA detection | In this this state, the AP detects the signal power with which the message is received from the STA. This information is shared with the global network of APs using message M12 "STA Detection" and the MAC of said STA or another global identifier of the STA. In this way, all of the APs in the network know that this particular AP detects the STA, and with what power it receives its messages.<br>The AP in turn verifies if enough information has already been collected about which APs detect the new STA. In light of the information it has about the network, i.e. the network vector, the neighbor vectors of each AP, and the channels assigned to each AP, in addition to the "STA information messages" from other APs, the AP can determine if it is the last to receive a message from the STA, be it a Probe Request or an Authentication Request.<br>If the AP determines that there is already enough information to select the candidate AP, or if a time "t4" passes without receiving more messages from other APs that detect the STA, it transitions to state S13.5. Here different operational modes may also be configured. For example, mode 1, wait until the last AP has received a message from the STA to transition to S13.5; there may, for example, be a total of 20 APs that detect the STA. Mode 2, wait to have a minimum number of APs that have received a message from the STA, for example 3 APs, to transition to S13.5. Mode 1 makes it possible to optimize as much as possible the selection of the AP, but requires more time to compile all of the information about the network. |
| T13.2 | | The AP returns to state S9. |
| T13.3 | | If the AP determines that there is already enough information about which APs detect the STA, it transitions to state S13.5. |
| T13.4 | | When an AP receives an M12 message it transitions to S13.2 |
| S13.2 | Add to the list of APs that detect an STA | In this state the AP stores the information about the power with which another AP in the network detects a new STA. Each time information is stored about an AP that detects an STA, a time stamp is added to the information. This time stamp is taken into account when assessing said information. Information with a time stamp above time "t5" will not be taken into account, as they will be considered obsolete.<br>The AP sends an M3 message, "Consent", to confirm receipt of the "STA Information Message". |

-continued

| | State/Transition | Comment |
|---|---|---|
| T13.5 | | The AP returns to state S9 |
| T13.6 | | This transition is optional.<br>Once the AP knows that there is a new STA that wants to associate with the network, it can accelerate the process of detecting which APs see the STA by asking the STA to take measurements in its radio environment. In this case, the AP transitions to S13.3. |
| S13.3 | Order measurements of the environment of the STA | Together, all of the APs in the network generate a global database in which they store information about the STAs in the network (known by all of the APs). Among said information is included whether the STA supports radio environment measurements or not.<br>First, the AP checks with the MAC or another identifier of the STA that said STA is not marked as an STA that does not support radio measurements. In said case, the AP sends an M13 message, "Environment measurement request", requesting that the STA take radio measurements of its environment. This message may be answered with the message defined in protocol 802.11, "Radio Measurement Request Frame", or other such request messages. The AP can order one or more measurements from the STA in order to obtain the information about which APs detect the STA on each channel. |
| T13.7 | | If the STA is marked in the database as not supporting radio measurements, the AP returns to S9. |
| T13.8 | | After sending M13, the AP transitions to S13.4. |
| S13.4 | Await report | The AP waits for a time "t6" to receive message M14, "Environment measurement report", from the STA. |
| T13.9 | | 2 options:<br>Once M14 has been received, more measurements must still be taken; the AP returns to state S13.3<br>Alternatively, once "t6" has passed without receiving a response from the STA, the AP transitions to state S13.3. This is repeated "n2" times. |
| T13.10 | | After waiting for time "t6*n2" without receiving a response, the AP enters the MAC of the STA in the global database as an STA that does not support radio measurements and shares this with the APs in the network, sending message M15, "STA does not support environment measurements". The AP returns to state S9. |
| T13.11 | | Once M14 has been received, the AP transitions to S13.5. |
| S13.5 | Estimate positions of the STA | The network made up of a set of APs deploys to provide service to a specific area, which we will refer to as the area of interest. This area of interest is configured in each AP in the network using GPS coordinates or the like. In addition, each AP has its own location coordinates recorded. These coordinates are sent to all the APs in the network during the launch process, meaning that the whole network knows the coordinates of all of the APs. The network also knows the power at which each AP transmits and on which channel.<br>In this state the AP also knows which APs detect the new STA and with what power. As such, by using known triangulation algorithms, the AP is able to estimate the position of the STA within a certain margin of error. The model for determining the position of the STAs will depend on each specific scenario. So, there are methods suited for inside environments such as offices and homes, and other which are better suited for outside environments such as public squares and parks.<br>This estimate is used to determine if the new STA requesting access to the network is found within the area of interest. If the STA is found outside the area of interest, it is denied access. To do so, the AP in S13.5 returns to S9 and does not send confirmation of authentication, or, alternatively, it sends an authentication failure reply to the STA.<br>This is what we call location-based exclusion, or access restricted to the area of interest. |

| State/Transition | | Comment |
|---|---|---|
| | | If it is not possible to determine the position of the STA with sufficient precision, the network administrator can decide what to do with these STAs. To this end service and accessible access policies are established for the network administrator.<br>It is not necessary to estimate the position of the STA in order to select the AP that is the candidate to provide it with service. The position of the STA is used solely for the purpose of excluding STAs that are outside the area of interest of the network. If an area of interest is not defined for a particular network, state S13.5 is not necessary. |
| T13.12 | | If the STA is outside the area of interest, the AP transitions to state S9. |
| T13.13 | | If the STA is inside the designated area of interest, the AP transitions to state S13.6 to choose the best candidate AP for accepting the new STA connection. |
| S13.6 | Select AP | In this state, the AP orders the APs that detect the new STA according to the SNIR with which they detect the new STA. The SNIR with which each AP detects the new STA is calculated by using the formula shown above. The AP with the highest SNIR is selected..<br>If the same AP that is in S13.6 is the candidate to provide service to the new STA, the former transitions to S13.9, wherein it will accept the new STA connection. If another AP is the best candidate, this AP sends an M16 message, "Notify candidate AP", to indicate to the other AP that it must accept the connection with the new STA.. |
| T13.14 | | If the same AP that calculates the SNIRs determines that it, itself, has the highest SNIR, or if no AP with a higher SNIR consents to accept the new STA, the AP transitions to S13.9. |
| T13.15 | | The AP transitions to S13.7 after notifying the candidate AP. |
| S13.7 | Await confirmation | The AP waits a time "t7" for confirmation that the candidate AP accepts to connect with the new STA. |
| T13.16 | | If, after "t7", there is no answer, or if the candidate AP answers with an M17 message, "Negative", the AP returns to S13.6. If the reason for returning is t7, then the AP resends M16 to the same AP; this attempt is repeated "n3" times. If the reason is an M17 message, then the AP sends an M16 to the next AP in the list. |
| T13.17 | | Once the AP receives message M3, it transitions to S9. |
| T13.18 | | When the AP receives M15, it transitions to S13.8. |
| S13.8 | Update database | The AP adds the STA along with its MAC or other global identifier to the database, indicating that it does not support environment radio measurement requests. Doing so avoids unnecessary requests and waiting in the future. |
| T13.19 | | The AP returns to state S9 |
| T13.20 | | When the AP receives M16, it transitions to S13.9. |
| S13.9 | | In this state the AP verifies whether it has the resources to accept the new STA. If affirmative, it answers the AP that sent the M16 with an M3, and if negative, it answers with an M17. If affirmative, the AP answers the STA with an M18 message, "Authentication confirmation", (from 802.11, "Authentication Response Frame") (passive scan), or an M19, "Probe Response" (active scan). In this way, as far as the new STA is concerned, there is only one AP that can provide it with service on the network. |
| T13.21 | | The AP returns to state S9 |

Figure 11:
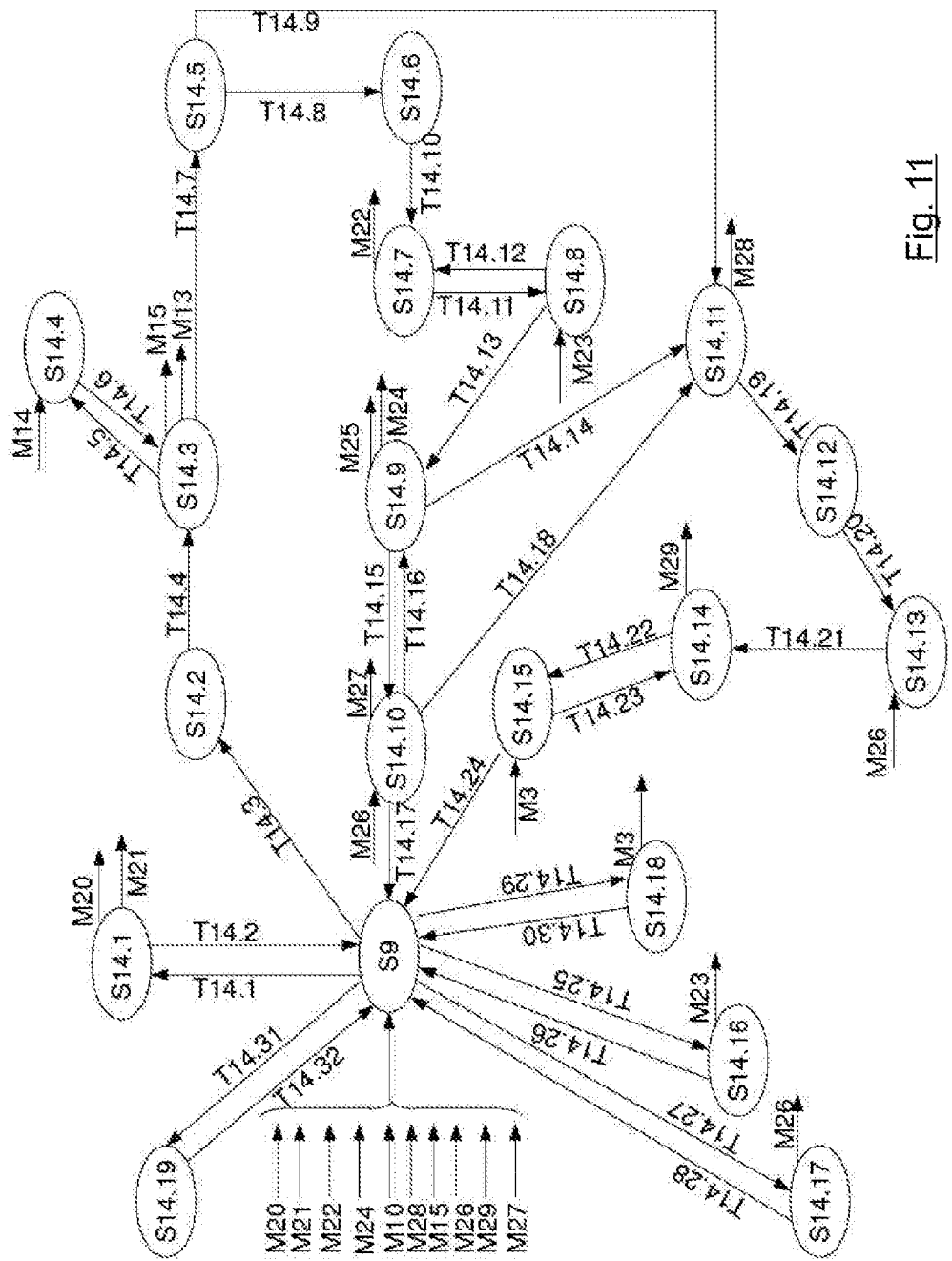
FIG. 11 represents a state machine that models the load balance process.

FIG. 11 shows the state machine of the load balance process. This state machine, or group of states encompassed by S14, describes the network load balance process.

In state S9, Standby, the access points (APs) can provide service to the users or STAs that connect to the network. The appearance of users or STAs on the network creates a load on the network. In traditional networks, this load is distributed between the various access points (APs), but not homogeneously, i.e. there may be some access points (APs) that are congested while others are idle, as it is the user or STA that decides which access point (AP) to connect to.

This process starts when the access point (AP), after monitoring its network resources, detects that alert level 2 (a specific level of congestion) has been reached. This is represented with the message, "Alert 2". After detecting alert level 2, the access point (AP) starts a process of selecting a station (STA) to be a candidate for transfer to another access point (AP) with more available network resources to provide it with service, thus reducing the level of network congestion.

The selection of the candidate station (STA) is carried out based on the following data:

Power with which the access point (AP) receives the messages from the station (STA), or, equivalently, the level of SNR (Signal-to-Noise Ratio), the incoming and outgoing data rates, or the MCS used. These data can be linked together in protocol 802.11.

Network resources consumed by each station (STA) to which the access point (AP) provides service, which can be measured based on incoming traffic, outgoing traffic, data rate for both incoming and outgoing data, channel occupancy metering, or other alternative measurements.

For each station (STA) to be transferred, information about the access points (APs) that it detects and with what power it detects them. Alternatively, information on which access points (APs) see the candidate station (STA), and with what power. Power or other equivalent measurements that make it possible to distinguish the quality of the signal received, such as RSSI or SNR.

Based on this information, the access point (AP) selects the candidate station (STA) based on the following criteria:

That it generate the least possible amount of interference when transferred to another access point (AP) with more resources. Thus, stations (STAs) will be preferred having a single additional target access point (AP) that can provide them with service, minimizing interference with neighboring networks.

That the candidate station (STA) significantly reduce the channel occupancy time of the access point (AP) to which it is connected, thus generating less interference with stations (STAs) associated with this access point (AP) and with stations (STAs) associated with neighboring access points (APs).

After selecting the candidate station (STA), the next step is to search for the target access point (AP) to continue providing service to the selected station (STA). Some stations (STAs) support radio environment measurements, while others do not. The STAs that do support said measurements will be able to provide a list of APs that they detect in their environment. This list makes it possible to know which target access points (APs) can accept to associate with the selected STA. In general, priority is given to transferring STAs that support radio environment measurements. There are 2 possible cases:

1) The STA to be transferred supports radio environment measurements. In this case it is requested that it takes measurements of its environment to find out which APs it detects and with what power. Afterwards, the list of APs is ordered using the SNIR calculation formula explained above, and the APs are ordered by SNIR from highest to lowest. Next, the AP with the highest SNIR is asked whether it has capacity to accept the new STA; if so, the STA is transferred. An AP deems that it has sufficient available network resources if it has not reached alert level 1.

2) The STA does no support radio environment measurements. In this case, the global database kept by all of the APs is searched to find which access points detect this STA and with what power. This information is accompanied by a time stamp and will only be taken into account if from measurement time to request time no more than a certain amount of time has passed. Many STAs, even when associated with an AP, continually send out Probe Requests to see what available APs there are. Thus, the APs can keep up-to-date information on what STAs they detect in their environment. What follows thereafter is similar to case 1), ordering the APs that detect the STA from highest SNIR to lowest. They only take into account the APs that have carried out measurements of the Probe Request within the configured time range.

3) The STA does not support radio environment measurements and there is no data from other APs that detect it, or the data have a time stamp that exceeds the configured expiration time. To transfer the STA, it is necessary to use blacklists based on the MAC of the STA, or some other such unique identifier. The AP informs the other APs in the network that it wants to transfer this STA. Next, the AP disassociates the STA and blacklists it using its MAC or another identifier, and the rest of the APs erase it from their blacklists should it happen to be listed there. In this way, when the STA tries to reassociate with the network, only other APs in the network will be able to accept the connection. The APs exchange information during this process. If no AP in the network receives the association request from the STA, the source AP takes it off the blacklist, as in this case only this AP can provide it with service. If said STA cannot be transferred, the next one on the list is tried.

FIG. 11 shows the state machine that models the load balance process, whereas the following explains in detail the states and transitions:

| State/Transition | | Comment |
| --- | --- | --- |
| T14.1 | | Periodically, every "t8", the AP transitions to S14.1. |
| S14.1 | | The AP verifies the state of its network resources, and if they surpass the threshold of alert 1, it emits message M20, "Alert 1"; if it surpasses the threshold of alert 2, it emits message M21, "Alert 2". M20 indicates that it must not accept new connection as there is danger of congestion. M21 indicates that it must transfer one of its STAs to another AP with more resources. M20 and M21 are internal messages |
| T14.2 | | The AP returns to state S9. |
| T14.3 | | When the AP receives M21, it transitions to S14.2. |
| S14.2 | Order the list of STAs | When M21 comes, the AP has to transfer an STA to another AP to relieve its network interface and reduce the risk of congestion. The aim of this state is to select the most optimal client station using the criterion of distance from the host access point, calculated indirectly by means of the power received by the AP from the STAs that are within its range. To do so, the AP orders the stations from lowest to highest based on the received power or, equivalently, SNR or channel occupancy. If there are two STAs with the same received power or SNR, the AP orders them according to the bandwidth they consume, such that service will preferably be provided to the STA that demands the greatest bandwidth. As a results, the first STA on the list will be the ideal STA to be transferred, and so on down the list. |
| T14.4 | | Once the list in order of preference has been identified, the AP transitions to S14.3 |
| S14.3 | Measure the environment of the STA | The AP takes the first STA in the list obtained in S14.2 and verifies whether it is listed in the database as an STA that does not support radio measurements. If it is in the database, it moves on to the next STA in the list. Once it has found an STA in the list that supports radio measurements or that is not in the database, the AP sends it an M13 measurement request message. The idea is to see which APs can be detected by an STA that is a candidate for transfer to another AP. These measurements are useful for detecting possible interference. |

-continued

| State/Transition | | Comment |
|---|---|---|
| T14.5 | | The AP transitions to state S14.4. |
| S14.4 | Wait | The AP waits for a time "t9" to receive message M14. If after "t9" the AP has not received M14, it returns to state S14.3 and resends message M13. After attempting "n4" times without receiving a response (after a time t9*n4), the AP returns to S14.3, but this time it sends an M13 message to the next STA in the list. It also sends out an M15 message so that all of the APs in the network know that this STA does not support radio measurements and update their databases accordingly. It also moves on to the next STA in the list, if the previous STA has carried out measurements but does not find any AP in its environment. |
| T14.6 | | Once time "t9" has passed, the AP transitions to state S14.3. |
| T14.7 | | Several possibilities: 1) The AP reaches the end of the list of the STAs without finding any that can take radio measurements. 2) The AP finds an STA that takes radio measurements and has answered with information about which APs it detects and with what power. 3) The AP finds an STA for which the APs have recently detected and measured Probe Requests, with a time between measurement and verification of less than "t10". In all cases, the AP transitions to state S14.5. |
| S14.5 | Select STA | There are 2 alternatives that can be configured in order. To carry out this selection. 1) Received power or SNR; as such it transfers the first STA in the list resulting from the ordering in state S14.2. States S14.3 and S14.4 are no required. It may also be the case that there is no associated STA that supports radio measurements, or of which it is known which APs detect it. 2) STA supports radio measurements; as such it transfers the first STA in the list generated in S14.2, for which measurements of its radio environment have been taken, meaning that we have greater visibility of potential interference. States S14.3 and S14.4 are required. 3) There is current data (less than "t10") about which APs detect the STA and with what power. All of the alternatives are supported and can be used alone or in combination. One way to combine them, for example, is to analyze the delta of the decibels between the received power of the first STA in the list obtained in S14.2 and the received power of the first STA in the list obtained in S14.2 that supports radio measurement messages. If this delta is small, i.e. under threshold TH1, then the STA that supports radio measurements is taken, since the information about this STA is more complete. At this moment it is known whether the STA to be transferred has carried out radio measurements in its environment or not, and if there are other APs that detect it and with what power, and if this information is recent. |
| T14.8 | | If the STA to be transferred has taken radio measurements of its environment and there is current data in the database about other APs that can detect the STA, the AP transitions to state S14.6 to select an AP. |
| T14.9 | | If the STA to be transferred has not taken radio measurements of its environment and there is no current information in the database about other APs that can detect the STA, the AP transitions to state S14.11 to transfer the STA to another AP. |

| State/Transition | | Comment |
|---|---|---|
| S14.6 | Order AP list | The STA has measured which APs are in its environment and with what power it detects them, and there is information in the database about which APs detect the STA and with what power. The AP orders the list of APs based on the SNIR of each AP. It calculates the SNIR with the formula explained in the preceding section. The aim is to minimize any interference on the network, which an STA could potentially cause when transferred to another AP. |
| T14.10 | | The AP transitions to S14.7. |
| S14.7 | Obtain AP data | The AP sends message M22, "AP data request", to the first AP in the list. |
| T14.11 | | The AP transitions to S14.8. |
| S14.8 | Wait | The AP waits for response M23, "AP data response", from the target AP. |
| T14.12 | | If a time "t11" has passed without receiving a response, the AP returns to S14.7 to send M22 again. If after attempting "n5" times the AP has not received M23, the AP sends a data request to the next STA in the list. |
| T14.13 | | Once the response has been obtained, the AP transitions to S14.9. |
| S14.9 | Change STA | Once a target AP has been selected, we go on to change the STA from the source AP to the target. AP. The AP that we have selected is the one with the lowest SNIR, and has available capacity to support the STA. Once we have selected the target AP, we verify whether the STA is listed in the database as an STA that does not support 802.11 "BSS Transition Management" messages. If it is not in said list, we proceed as follows. To change the STA we carry out 2 actions: 1) The AP broadcasts message M24 "AP change request", to the entire network, indicating the target AP to which we will change the STA. In this way, the entire network is aware that this STA has to be associated with this AP, and not with any other. 2) The AP sends a transition request to the STA for it to change its AP. To do so, it uses message M25 802.11, "BSS Transition Management Request", indicating the ID of the target AP as the only candidate out of the list of APs. The target AP is the one that provides confirmation once the STA has associated properly. This makes the process a confirmed process, and, as only the target AP is entered in the list of possible candidates, the STA is forced to associate with this AP. |
| T14.14 | | If the STA is listed in the database as an STA that does not support 802.11 "BSS Transition Management" messages, the AP transitions to S14.11. |
| S14.11 | | If the STA is not listed in the database as an STA that does not support 802.11 "BSS Transition Management" messages, the AP transitions to S14.10 |
| S14.10 | Wait | The AP waits until the target AP provides it with confirmation that the STA has associated. This makes the process a confirmed process, and the network knows that the STA is receiving service again. Message "BSS Transition Management Response" is optional in 802.11, and so we will not wait for confirmation thereof. Conversely, the target AP is the one that provides confirmation once the STA has associated, sending M26, "AP change confirmation". |

| State/Transition | | Comment |
|---|---|---|
| | | The AP waits a time "t12"; if it does not receive confirmation, 2 things might have happened: 1) That the STA does not support "BSS Transition Management" messages. In consequence, the STA remains associated with the same AP. In this case, the AP broadcasts message M27, "STA does not support BSS Transition Management", and transitions to S14.11. The fact that the STA does not support "BSS Transition Management" is entered into the database for future use. 2) That the STA has associated with a different AP than the one indicated. In this case, the new AP will make a new request for change to the target AP to which the STA should associate. |
| T14.16 | | The AP returns to S14.9 to resend message M24; this is repeated "n6" times. |
| T14.17 | | After receiving M26, which is the confirmation that the STA has associated properly to the selected target AP, the AP returns to S9. |
| T14.18 | | If the STA does not support 802.11 "BSS Transition Management" messages, the AP transitions to S14.11. |
| S14.11 | Blacklist STA | We use this method as an alternative when the STA does not support 802.11 "BSS Transition Management" messages. The method consists in informing the APs in the network that an STA is going to be transferred, by means of message M28 "MAC of STA to be transferred". This message contains the identifier of the STA to be transferred, and optionally of the target AP. If it does not contain a target AP, the source AP blacklists the STA to prevent it from connecting, and all of the APs in the network eliminate it from their own blacklists (if it was there). Thus, the STA will associate with an AP other than the source. If the target AP is indicated, all of the APs in the network except the target blacklist it. |
| T14.19 | | The AP transitions to S14.12. |
| S14.12 | Disassociate STA | The AP disassociates the STA that it wants to transfer. |
| T14.20 | | The AP transitions to S14.13. |
| S14.13 | Wait | The AP waits to receive M26 from the target AP, indicating that the STA has associated properly. It waits time "t13". |
| T14.21 | | Regardless of whether or not the AP receives M26, the AP transitions to S14.14. |
| S14.14 | Eliminate STA from blacklist | The AP eliminates the STA from the association blacklist and broadcasts an M29 message, "Eliminate STA from blacklist", to the APs in the network so that they, too, will eliminate it |
| T14.22 | | The AP transitions to S14.14. |
| S14.15 | Wait | The AP awaits M3 confirmation from the APs that the STA has been eliminated from the blacklist. |
| T14.23 | | If after waiting "t14" no response has been received, the AP returns to S14.14. This is repeated "n7" times. |
| T14.24 | | The AP returns to Standby once it receives message M3, or after a time t13*n7 has passed without a response. |
| T14.25 | | When the AP receives an M22 message, "AP data request", the AP transitions to S14.16. |
| S14.16 | Send AP data | The AP sends the requester an M23 message, "AP data response", with information about the resources it has available for accepting clients. |
| T14.26 | | The AP returns to state S9. |
| T14.27 | | When the AP receives an M24 message, "AP change request", the AP transitions to S14.17. |
| S14.17 | STA associated | The AP transitions to this state and waits time "t15" for the STA to associate. If the STA associates, the AP sends an M26 message, "AP change confirmation", to the source AP. |
| T14.28 | | The AP return to state S9. |
| T14.29 | | When the AP receives an M28 message it transitions to S14.18. |
| S14.18 | Consent action | The AP blacklists the indicated STA and consents to the action of the source AP. |
| T14.30 | | The Ap returns to state S9. |
| T14.31 | | When the AP receives M15 or M27 it transitions to S14.19. |
| S14.19 | Update database | The AP updates the database with the information received. |
| T14.32 | | The AP returns to state S9. |

Figure 12:
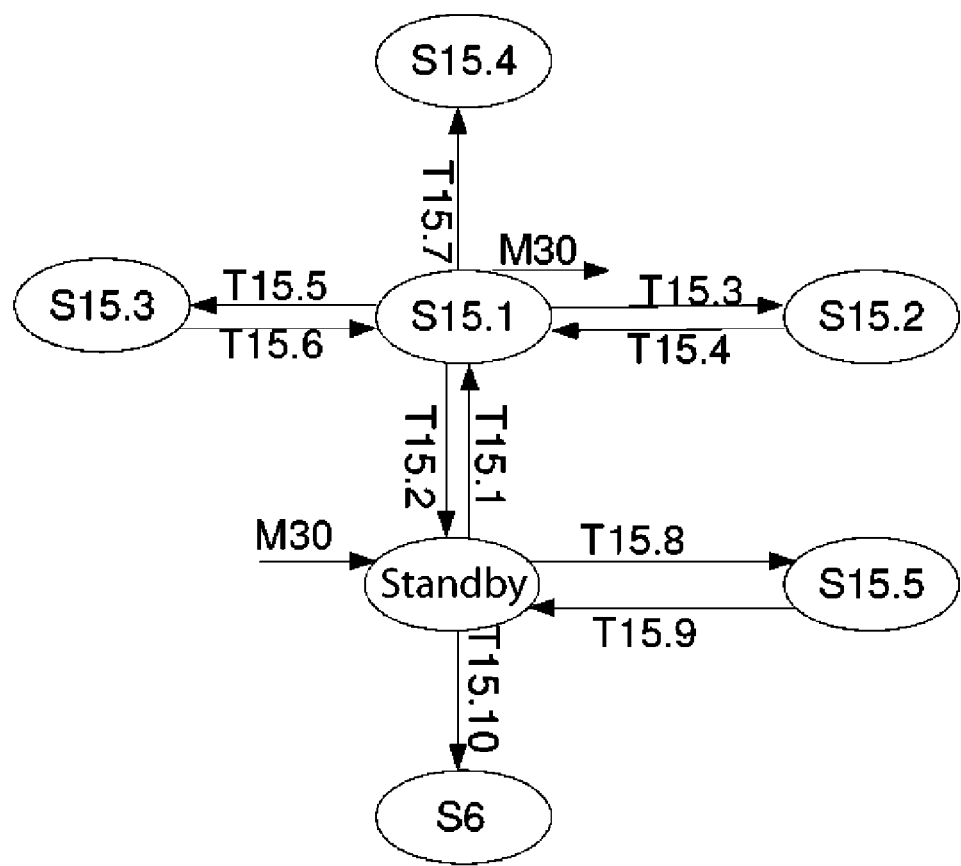
FIG. 12 represents a state machine of the automatic failure response process.

FIG. 12 shows a state machine of the automatic failure response process. The aim of the following state machine is to monitor any problems that the nodes might encounter, both locally and in the network community, and act when faced with errors.

The access points periodically send out M30 packets, "AP state report", to inform the nodes in the network as to the state of their network interfaces. Moreover, at the same time, it receives the M30 messages of the rest of the nodes to keep the list of active access points up to date.

Figure 13:
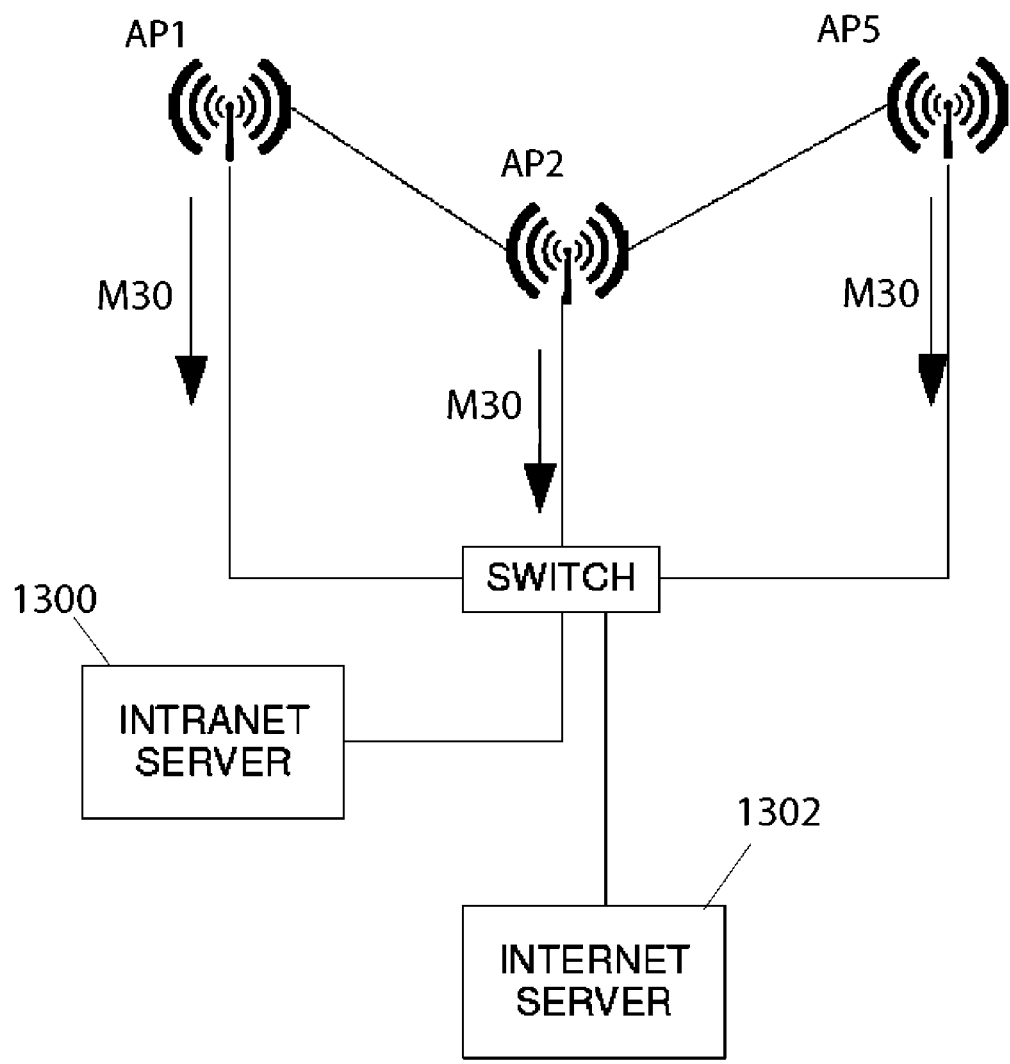
FIG. 13 shows a model of the deployment of a complete network.

A typical network implementation outline comprises not only a set of access points, but also includes an external connection to the internet, or an internal connection to a content server or intranet. FIG. 13 shows the model of deployment of a complete network, by way of example.

Message M30 is sent to the multicast address to which all of the APs in the network belong. As shown in said FIG. 13, this M30 message can be sent through the network interface, which connects all of the machines to give them external access to an intranet 1300 server or an internet 1302 server. Alternatively, this communication may take place via the radio interface of the APs in MESH topologies.

Each AP represents a machine that can have one or more radio interfaces; thus, there are APs with one radio interface that supports one channel, and APs with two radio interfaces that support two simultaneous and independent channels.

Message M30 contains the following information:

| Interface | State | IP | STA Connections |
|---|---|---|---|
| WLAN0 | Active | 192.168.W.X | STA MAC1 |
| | | | STA MAC2 |
| | | | ... |
| | | WLAN0 interface usage statistics | |
| WLAN1 | Active | 192.168.Y.Z | STA MAC27 |
| | | | STA MAC38 |
| | | | ... |
| | | WLAN1 interface usage statistics | |
| ETH0 | Active | 192.168.P.Q | |
| CPU Consumption, RAM Memory | | | |
| Error/event log | | | |
| ... | | | |

NOTE: In this example, the ETH0 interface is the one used by the APs to send the control messages. There may be other network topologies in which it works equally well, for example a MESH of APs that communicate using a common radio control channel, or some other hybrid technology with MESH and wiring between APs.

The possible states of an interface are:

Active; the interface is active and can provide service to the STAs connected to it.

Inactive; the interface is on but lacks activity.

Disabled; the interface has been disabled by the network administrator.

Failure; the interface is experiencing a failure of some sort and does not respond.

Restarting; the interface is being restarted.

If all of the interfaces are active, this means that the AP is operating normally and no action is taken.

If one them is inactive, this means that the AP is operating normally but lacks activity in one of its interfaces.

If one of the interfaces is marked as failure, this is when some sort of action must be taken. The AP itself will attempt to solve the problem by restarting its interface. If this does not solve the problem, the AP resets itself completely. If this does not work, and it can still communicate via the Ethernet interface, it sends an M30 reporting the failure to the rest of the APs in the network.

The APs in the network include this interface in the list of failures, and take it into account when making future decisions about transferring STAs to this interface. If the AP reports failures in all of its WLAN interfaces, it is eliminated from the list of APs, whereupon the shared key is generated anew without taking this AP into account, i.e. the APs transition to state S6.

If message M30 is not received from an AP after several attempts, one of the following things could be taking place:
1. The ETH interface of the AP is in a state of failure. If after trying to reset it continues to be in a state of failure, and if after resetting itself the interface continues to be in a state of failure, the AP does not have access to external services such as an intranet or internet server. In this case, the AP turns off to prevent any STAs from attempting to connect to it.
2. The AP is off, blocked, all of its interfaces have failed, or it has failed completely. In this case, after a certain time the APs transition to state S6 to generate a new encryption key without taking into account the AP that is in a state of failure or is turned off.

The STAs that lose their connection to this AP will attempt to join the network again, since they will identify other APs with the same SSID, and will automatically distribute themselves among the APs that are operating.

The state machine that governs the operations of the APs is shown in FIG. 12, whereas the states and transitions are described in the following table:

| | | |
|---|---|---|
| T15.1 | | Every time t16 the AP transitions to S15.1. |
| S15.1 | Self-Test | The AP carries out a test of all of its network interfaces to verify whether they are operating correctly, and sends the result to the rest of the APs in the network by means of message M30, "AP state report". |
| T15.2 | | If no failures have been detected, the AP returns to Standby. |
| T15.3 | | If any of its interfaces is in a state of failure, the AP transitions to state S15.2. |
| S15.2 | Reset interface | The AP resets the failing interface. |
| T15.4 | | The AP transitions to S15.1. |
| T15.5 | | If the interface still does not work, the AP transitions to state S15.3. |
| S15.3 | Reset AP | The AP resets itself completely. |
| T15.6 | | The AP does another Self-Test. |
| T15.7 | | If the failure affects the interface used by the decentralized controller, the AP is not able to send the M30 messages. The AP transitions to S15.4. |
| S15.4 | Turn off AP | The AP turns off. |
| T15.8 | | If an M30 message arrives the AP transitions to S15.5. |
| S15.5 | Update database with AP failures | The APs save a list with the APs and the state of their interfaces. This list is updated with each M30 received. |
| T15.9 | | The AP transitions to Standby. |
| T15.10 | | If time n8*t17 has passed, the APs transition to state S6, in which they generate a new encryption key without taking into account the failed AP. |

The following process, S16, corresponds to optimizing the automatic transmission channel selection. In state S7, the access points (APs) that make up the network based on the decentralized controller (110) reach an agreement about automatically assigning the transmission channels. This is done based on the power that each access point (AP) detects in the M4 "Beacon" messages of its neighbors, as well as external networks that are unrelated to the decentralized controller. The power of the beacon received at an access point (AP) indicates the power of the interference that will be received. However, this does not take into account with what frequency this interference will be experienced. In order to determine this unknown, once in S9, "Standby", the access points (APs) begin to accept stations (STAs) and communicate with them. At the same time they monitor the channel on which they are operating in order to detect the noise and interference (N+I) on the channel, as well as the channel occupancy caused by transmissions that use the same channel but are unrelated to their associated stations (STAs). It does this with the physical layer measurement unit (104), with which it detects all of the messages transmitted on the channel, along with their duration and power. In addition, the physical layer measurement unit (104) makes it possible to determine whether these detected packets come from external networks or from other access points (APs) in our own network. With these parameters, each access point (AP) is able to determine the level of interference and the duration and frequency of the same. Each access point (AP) is able to create a diagram of interference power versus time, and with it generate statistics that are useful for optimizing transmission channel selection. When these levels surpass certain configurable thresholds, the specific access point (AP) will inform the rest of the access points (APs) in the network of the situation and will request a channel change. At this point two cases may be singled out:
1) When the individual change counter $ICC_{MAX} > 0$. If interference power N+I is very high (above noise threshold $I_{MAX}$) for a minimum duration of $D_{MIN}$, impeding the communications of this access point (AP), this access point (AP) interrupts its communications with its associated stations (STAs) and starts to scan the whole spectrum to find a channel with less interference. In this case, the station (STA) only changes its own channel. At the same time, it broadcasts a message to all of the access points (APs) in the network so that they know that this access point (AP) has changed channel. The access points (APs) in the network increase their individual change counter ICC by 1. When the ICC reaches a maximum number of individual changes ($ICC_{MAX}$) the access points (APs) in the network return to state S7 and recalculate the channel assignment. If $ICC_{MAX}$ is equal to 0, this means that individual channel changes by access points (APs) are not allowed; in this case, we are in the following section below.

2) When $ICC_{MAX}=0$, then it is only possible to change the channel of all of the access points (APs) in the decentralized controller network that are configured on the same transmission channel and are part of the same independent group (further on it is explained how the independent groups are obtained) as a group. In other words, all of the access points (APs) belonging to the same independent group request to change channel. In this case, there must be at least a minimum number of access points ($NAP_{MIN}$) within the independent group that are affected by the noise threshold $I_{MAX}$ for a minimum duration of $D_{MIN}$. Should $NAP_{MIN}$ be reached within an independent group, this group requests the change from the network, whereupon all of the access points (APs) in the network return to S7 in order to reassign the channel.

Another crucial aspect to highlight about the network based on the decentralized controller (110) is its capacity for dynamic self-learning. The access points (APs) in the network with a decentralized controller (110) keep a local database with information about the stations (STAs) that are associated with them, as well as other stations (STAs) that have associated with them in the past, or that have associated with other access points (APs) in the network. The information is kept along with a time stamp, so that the information can either expire or not, depending on the configuration. In this way, the network learns about the capabilities supported by the stations (STAs) that join the network, or that have joined it in the past. The parameters that are stored in the local database are the following:

Support for messages defined in 802.11k and 802.11v. These messages have been integrated into standard 802.11. Because they are optional messages, and since they have only recently been integrated into standard 802.11, not all stations (STAs) on the market support them. In order to take advantage of those that do support them, and to avoid using them with those that do not, the access points (APs) in the network store said information in the database. They obtain this information during interactions between the access points (APs) and the stations (STAs) in the processes defined in S13 and S14. This information does not usually expire, and is recorded with the MAC of the device in question. The advantage of knowing this information is that it accelerates processes S13 and S14, and makes the most of the capabilities of the stations (STAs) that support 802.11k and 802.11v.

Support for active scanning. When Probe Request messages are received from a station (STA), it is identified in the database as an STA that supports active scanning. This information is useful for the purpose of knowing if we will have information about the power with which the access points (APs) see this station (STA), and if we can carry out the method for association using the active scan or not.

Support for dual-band operation. The network learns about what stations (STAs) support both frequency bands, 2.4 and 5 GHz. It already obtains this information from the active scans carried out by the station (STA). When a station (STA) supports both frequency bands, it carries out an active scan, sending probe requests on both bands. These probe requests are received by access points (APs) that operate on 2.4 and on 5 GHz, and so the access points (APs) store this information, and also broadcast it to share with the rest of the access points (APs) in the network. This information is very useful when balancing the network load.

For example, consider a station (STA) that supports both frequency bands; when balancing the network load we can choose from a greater number of alternative access points (APs) to which such a station (STA) can be sent, as we can choose both those operating on 2.4 GHz and those operating on 5 GHz. Moreover, if the 2.4 GHz network is overrun, we can significantly improve overall network operations by transferring stations (STAs) from 2.4 GHz to 5 GHz.

Power with which the access points (APs) detect a station on the network. This information is initially obtained through the receipt of probe requests (active scan) or through the authentication request messages (passive scan), and, subsequently, through the receipt of any message sent by the station (STA). A station's (STA) detection power is extracted by means of the physical layer measurement unit (104). The access points (APs) in the network continually refresh this information in order to keep it as recent as possible. This information is kept along with a time stamp, to indicate its age. Data that are older than a given interval T will be discarded from decision making. This information gives us the advantage of knowing which access points (APs) detect a station (STA) at a specific moment in time, and we can use it in processes S13 and S14 to optimize the assignment of an access point (AP) to a station (STA).

Support for HT, VHT. The decentralized controller (110) obtains this information from the messages received from the stations (STAs), be they authentication requests, association requests or probe requests. In these fields the stations (STAs) indicate whether they support HT and/or VHT. HT indicates the possibility of transmitting on 40 MHz channels, and VHT indicates support for channels from 80 to 160 MHz. Thanks to these parameters, the access points (APs) can configure certain access points (APs) to operate in HT or in VHT, and then transfer the stations (STAs) that support HT or VHT to these access points (APs). In this way assignment of stations (STAs) to access points (APs) is improved, thus optimizing the use of the capabilities of the stations (STAs).

Below is a description of the methods implemented by the logic of the decentralized controller (110) that take part in the states described in the previous section.

1. Start-Up Method

The start-up method is responsible for setting up the network interfaces (both radio and wired), unless the user indicates otherwise, and for establishing communications with the Hostapd daemon through the interface that it publishes for each radio available in the system. It thereafter recovers the secret key from the secure key storage. The key will be used later on to digitally sign and encrypt the protocol messages that, by nature, cannot be encrypted since they are sent before the shared secret key is generated. It should be remembered that the signature key must be identical in all the access points making up the network. Lastly, a pair of public/private keys are generated, which will serve to calculate the shared secret key. The unique identifier is set in factory and stored in an encrypted area of the ROM memory.

The wired interfaces are checked for connectivity if they are raised, reporting an alert if they are active or of they have any unconnected wiring. In the case of radio interfaces, the state of the radio frequency switches will be checked.

2. Choice of Channel Method

The choice of channel method is in charge of choosing the cleanest frequency for each node, i.e., the frequency with the least possible amount of interference. In addition, it orchestrates the nodes to emit on non-overlapping frequencies, so that various neighbors do not use the same channel, thus optimizing the Wi-Fi frequency spectrum. To carry out these operations, there is specific messaging between nodes, which allows them to reach an agreement as to this choice. This messaging has been described in detail above. This method contains the process that takes place in state S7.10 to assign channels to the APs in the network once information has been gathered about the latter.

This method is divided up into various sub-methods:

2.1 Independent Node Selection Method.

This problem is similar to the problem of coloring a political map in such a way that no two contiguous countries share the same color. The colors would represent the non-overlapping frequencies, and the states the access points. This problem is solved using graph theory, relating each state to a vertex of the graph, and connecting two vertices with a line if and only if they share a border, i.e. they are neighbors.

2.1.1. Bounds on the Chromatic Number

The smallest number of colors necessary to paint a graph G is known as its chromatic number, and is indicated as $X_v(G)$. Color class is used to refer to the subset of V that has been assigned the same color. A subset S of V is called an independent set if there are no two vertices in S that are adjacent in G.

Where $k \in N$, a k-clique in G is a complete subgraph of G with k vertices, which we will refer to as $K_k$. We will define $t(n,k)$ as the maximum number of edges that a graph with n vertices and without a k-clique can have. It follows, for example, that $t(n,2)=0$ because if a graph does not contain a 2-clique, then it does not contain any edges, since all edges form, together with their ends, a graph $K_2$. The clique number $\omega(G)$ of a graph G is the number of vertices in a maximal clique (a clique that cannot be extended to a larger-size clique by adding a vertex to it, i.e., a clique that does not exist exclusively within the set of vertices of a larger clique) in G. Based on this definition, it follows that the chromatic number is at least the clique number:

$$X_v(G) \geq \omega(G)$$

There is still no known general method to determine the chromatic number of an arbitrary graph. Nevertheless, there are bounds for X(G) as a function of other invariants of graph G, such as maximal degree or number of edges.

The aim of this point is to determine upper and lower bounds for the chromatic number of any given graph.

In any simple graph G with m edges in applies that:

$$X_V(G) \leq \frac{1}{2} * \sqrt{2m + \frac{1}{4}}$$

Any simple graph can be colored with one or more colors more than the maximum vertex degree.

$$X_v(G) \leq \Delta(G)+1$$

If G is not a complete graph, nor an odd-length cycle, then:

$$X_v(G) \leq \Delta(G)$$

Lastly, an independent set S of vertices of a graph G is called a maximal independent set if S is not a proper subset of any independent set of vertices of G. The maximal cardinal of an independent set is called the independence number of G, and is referred to as $\beta(G)$. It follows that $$X_v(G) \geq n/\beta(G)$$

2.1.2. Coloring the Nodes

As seen in the preceding section, it is not easy to determine the chromatic number of a graph. In fact, it is an NP-complete decision problem, known by the name of Chromatic Number Problem. As such, it is no surprise that there is no known efficient methodology for coloring the vertices of a graph with $c\chi(G)$ colors, where c is a constant with a positive value.

There are efficient methods, however, to color graphs in such a way that the number of colors used is "close" to its chromatic number. The heuristics used in these methods are the following:

1. Coloring a vertex of a high degree is more difficult than one of a low degree.
2. Vertices with the same neighbors should be colored at the same time.
3. Assigning many vertices the same color is a good idea.

In the sequential methodology, the vertices are colored one by one, such that the problem of coloring is tackled via the clique number, according to bound $X_v(G) \geq \omega(G)$. But there is another bound for the chromatic number. The independence number $\beta(G)$ tells us that no color class (vertices with the same coloring) can have more than $\beta(G)$ elements. Therefore, if we designate the number of vertices as n, it follows that $X_v(G) \geq n/\beta(G)$. This bounding tends to be better than the previous one for large graphs.

These ideas suggest that, as a first step, an independent set of vertices with a cardinal close to $\beta(G)$ should be located, and all of them should be colored with color 1; then, this set of vertices should be erased, and the process should be repeated in the resulting graph, and so on until all of the vertices have been colored.

One way to obtain the independent sets of a graph is as follows:

Step 1: Obtain the vertex with the lowest degree.
Step 2: Add the vertex to the current independent set.
Step 3: Eliminate the selected vertex and its neighbors from the graph.
Step 4: If the graph does not have any vertices, go to Step 5; if the graph has vertices, return to Step 1.
Step 5: Eliminate the vertices belonging to the current independent set from the graph.
Step 6: If the graph has no vertices, all of the independent sets have been obtained; go to Step 7. If the graph has vertices, start the current independent set and return to Step 1.
Step 7: End of process.

2.2. Method for Obtaining the Channel Assignment that Generates the Minimum Interference Possible.

Figure 14:
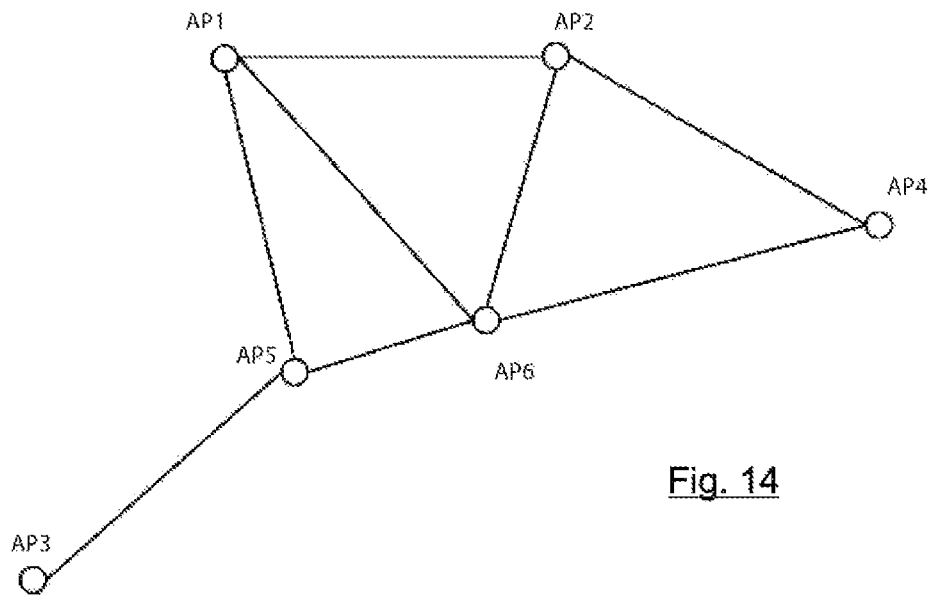
FIG. 14 shows an example of a network configuration to illustrate the method for obtaining the channel assignment that generates the least interference.

The special characteristic of the problem at hand is that, since the available radio spectrum is limited, there is a finite number of non-overlapping frequencies that we can use, i.e. the chromatic number cannot exceed the number of available frequencies. This means that if this threshold is surpassed, there will be adjacent nodes with the same color. Therefore, the methodology employed must necessarily minimize the effect of this frequency reuse on adjacent nodes. These areas of nodes using the same emission frequency are referred to as "conflict areas". Such areas may be present without the system being aware of their existence. For example, let us consider the network configuration shown in FIG. 14.

There are n=6 nodes distributed in a space whose graph is represented by the matrix:

$$\begin{bmatrix} 0 & 1 & 0 & 0 & 1 & 1 \\ 1 & 0 & 0 & 1 & 0 & 1 \\ 0 & 0 & 0 & 0 & 1 & 0 \\ 0 & 1 & 0 & 0 & 0 & 1 \\ 1 & 0 & 1 & 0 & 0 & 1 \\ 1 & 1 & 0 & 1 & 1 & 0 \end{bmatrix}$$

If we sum each component of each row, we obtain the degree of each node, whose vector would be:

$$g = [3\ 3\ 1\ 2\ 3\ 4]^T$$

If we apply the method explained in the preceding section, then we get the following groups as independent nodes:

$$n_1 = \{3, 1, 4\}$$
$$n_2 = \{5, 2\}$$
$$n_3 = \{6\}$$
$$X_V(G) = \sum_{\forall i} n_i = 3$$

And if we express this as a vector, we get:

$$n_1 = [101100]^T$$
$$n_2 = [010010]^T$$
$$n_3 = [000001]^T$$

As can be observed, the result gives us the group of nodes that can have identical colors without interfering with one another, in addition to easily determining that the chromatic number is three, i.e. we would need three non-overlapping channels in order for the contiguous nodes not to use the same frequency. Let us suppose that only two non-overlapping channels are available. This means that we will necessarily have to use the same channels for contiguous nodes. As such, the next step is to calculate, out of all the possible combinations, which is the one that will entail the least amount of interference, keeping in mind the system-external noise calculated in the channel survey method.

Based on the foregoing problem, it may be deduced that the number of changes that must be made will be:

$$N_{changes} = X_v(G) - N_{channels}$$

$N_{changes}$ independent groups will have to be chosen, to which a color from among the $N_{channels}$ possible channels will have to be assigned that will minimize interference. The number of possible combinations is given by:

$$\sum_{i,j} \frac{F(i,j)}{2} * PR_{X_V(G)}^{i,j}; \text{ where } \_F(i,j) = \begin{cases} 1, \text{ if } \_i = j \\ 0 \text{ otherwise} \end{cases}$$

$$i + j = X_V(G), i > 0, j > 0, i \geq j, i - j \leq X_V(G) - N_{channels}$$

Each one of these groupings will have a higher or lower probability of interference between nodes, depending on the power with which they are seen by those of their neighbors having the same emission frequency. Said value may be calculated as the sum of the interference powers of the nodes included in the same independent group:

$$P_{int}(i,j) = \vec{n}_j^T \cdot \vec{P}_i = \vec{n}_j^T \cdot [P] \cdot \vec{n}_i = \vec{n}_j^T \cdot \begin{bmatrix} 0 & P_{12} & P_{13} & P_{14} & P_{15} & P_{16} \\ P_{21} & 0 & P_{23} & P_{24} & P_{25} & P_{26} \\ P_{31} & P_{32} & 0 & P_{34} & P_{35} & P_{36} \\ P_{41} & P_{42} & P_{43} & 0 & P_{45} & P_{46} \\ P_{51} & P_{52} & P_{53} & P_{54} & 0 & P_{56} \\ P_{61} & P_{62} & P_{63} & P_{64} & P_{65} & 0 \end{bmatrix} \cdot \vec{n}_i$$

Where P is the matrix of powers whose $P_{ij}$ values indicate the power (expressed in mW) with which node i receives the signal of node j, or likewise, the power of the signal with which node j is seen by node i.

Matrix $P_{int}$ will be made up of the values calculated by means of above expression $P_{int}(i,j)$ for $1 \leq j, i \leq \chi_v(G)$.

Lastly, the $P_{int}$ matrix with the minimum value is chosen, and the channels are assigned in accordance with the different independent groups.

Figure 15:
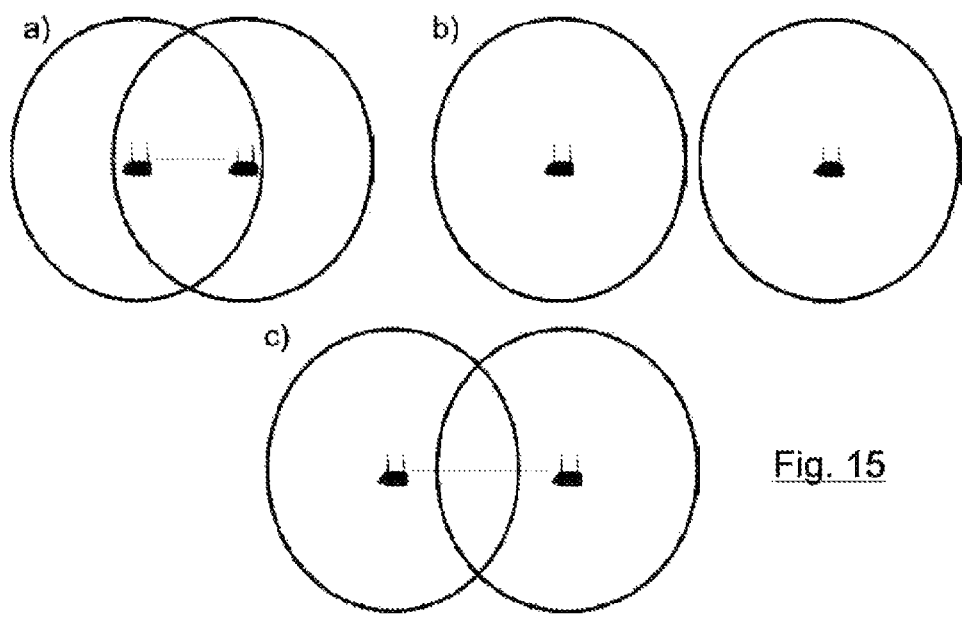
FIG. 15 shows possible situations of two APs overlapping each other.

In FIG. 15 we can observe all possible specific cases, assuming that the two access points have an identical range of carrier detection. In case "a)", both APs are located within the radius of action of their coverage, such that there is direct interference between them, which means that an edge can be drawn between the two nodes on the network graph. In case "b)", detailed in said figure, there is no overlap, meaning that an edge connecting them shall not be drawn on the graph, as there is not any interference between them. Lastly, case "c)" entails something of a coverage "conflict area" between the two nodes, although between the two of them it cannot be detected since they are not within the range of coverage. This would lead to an incorrect graph, drawing adjacent nodes as if they were independent. Said sort of conflict areas are only detectable by means of clients, and should be stored so as to take them into account for channel calculations.

It is deemed unnecessary to make this description any longer in order for anyone skilled in the art to understand the scope of the invention and the advantages deriving thereof. The hardware and methods employed therein shall be subject to variation, so long as said variation does not entail an alteration to the essence of the invention.

The invention claimed is:

1. A system for decentralized control of a wireless local area network, the system comprising a plurality of access points that provide connection service to a plurality of stations, wherein each access point comprises:
   a decentralized controller;
   a physical layer driver;
   a QoS control unit;
   a physical layer measurement unit adapted to monitor physical layer parameters; and
   a physical layer control unit adapted to configure a physical layer based on commands sent by the decentralized controller;
   wherein the decentralized controllers of the plurality of access points are configured to, during a start-up process of the wireless local area network or when an access point is added to the wireless local area network, wherein:
   each access point in the wireless local area network sequentially scans the channels to detect beacons transmitted by other access points of the plurality of access points and build a plurality of channel maps, each channel map of the plurality of channel maps containing network structure information of the plurality of access points whose transmitted beacons are received, a power with which the beacons are received;

the plurality of access point inter-transmit the plurality of channel maps corresponding to each access point of the plurality of access points, such that each access point gathers and shares the plurality of channel maps from the plurality of access points;

each access point in the wireless local area network is configured to locally compute the channel selection for all of the plurality of access points of the wireless local area network, wherein said channel selection is carried out based on the plurality of channel maps containing network structure information gathered and shared by each access point and using a criteria to minimize interference between the access points of the wireless local area network and minimize interference with other networks or wireless devices external to the wireless local area network; and each access point is configured to assign the transmission channel based on the locally computed channel selection for each of the plurality of access points of the wireless local area network.

2. The system according to claim 1, wherein the decentralized controllers of the plurality of access points belonging to the wireless local area network are configured to, during the start-up process of the wireless local area network or when an access point is added to the wireless local area network:

verify, for each respective access point in the wireless local area network, and after the transmission channel selection has taken place, whether there is direct interference with an access point that is within a corresponding range and has been assigned a same transmission channel, and when interference is detected among two or more access points, carry out an automatic transmit power selection, by reducing transmit powers assigned to the two or more access points in conflict.

3. The system according to claim 2, wherein the decentralized controllers of the plurality of access points are further configured to:

transmit a beacon message at a maximum assigned power;

in response to receipt by an access point of a beacon message, measure a power with which said message is received and verify whether said power exceeds a predetermined power threshold;

determine that interference has occurred if said power exceeds said predetermined power threshold; and iteratively reduce an assigned transmit power until the power of the received beacon message is lower than the predetermined power threshold.

4. The system according to claim 1, wherein the decentralized controllers of the plurality of access points are further configured to:

when a first access point in the wireless local area network receives an active or passive scan request from a station, communicate to one or more second access points that the station has been detected;

obtain a list of listed access points in the wireless local area network that receive a scan request from the station;

obtain a signal-to-noise-plus-interference (SNIR) ratio between each one of said listed access points and the station; and assign a particular access point with a highest signal-to-noise-plus-interference (SNIR) ratio to provide service to the station.

5. The system according to claim 4, wherein, in order to assign the particular access point with the highest SNIR ratio to provide service to the station, the decentralized controllers verify that the particular access point has a capacity sufficient to accept an additional connection, based on a determination that a load of said particular access point does not exceed a second predetermined threshold.

6. The system according to claim 4, wherein the each respective decentralized controller of each respective access point that receives a scan request is configured to directly calculate a respective SNIR ratio for the respective access point.

7. The system according to claim 4, wherein the each respective decentralized controller of each respective access points is configured to send the station a radio environment measurement request in accordance with standard 802.11k.

8. The system according to claim 4, wherein the decentralized controllers of the plurality of access points the wireless local area network are further configured to:

estimate a position of a station using information relating to respective locations of each of the plurality of access points and the respective SNIR ratio between the station and each one of the plurality of access points that detects the station;

verify whether the position of the station is outside a predetermined area of interest; and deny the station access to the wireless local area network if the position of the station is outside the predetermined area of interest.

9. The system according to claim 1, wherein each decentralized controller is further configured to monitor network resources of a corresponding access point and, if it is determined that the corresponding access point is congested:

select a particular station to be a candidate for transfer to a target access point with available network resources, wherein selection of the particular station is carried out based on one or more of the following criteria:

that the particular station generate a least possible amount of interference when transferred to the target access; and that the particular station significantly reduce a channel occupancy time of the target access point;

select the target access point based on the following criteria:

that the target access point have a capacity sufficient to accept the particular station; and that the target access point have a higher SNIR ratio; and transfer the particular station to the target access point.

10. The system according to claim 9, wherein the particular station is selected based on one or more of the following items of data:

a power with which the access point receives messages from the particular station;

network resources consumed by each station to which the access point provides service;

access points that the particular station detects, and with what power it detects them.

11. A method for decentralized control of a wireless local area network, the wireless local area network comprising a plurality of access points that provide connection service to a plurality of stations, the method comprising:

each access point in the wireless local area network sequentially scanning the channels, during a start-up process of the local area wireless network or when an access point is added to the wireless local area network, to detect beacons transmitted by other access points thereby building a plurality of channel maps, each channel map containing network structure information of each access point of the wireless local area network whose transmitted beacons are received, a power with which the beacons are received;

inter-transmitting among the plurality of the access points of the wireless local area network, the plurality of channel maps such that each access point in the wireless local area network gathers and shares all of the plurality of channel maps from all of the plurality of access points of the wireless local area network;

each access point locally computes a channel selection for all of the plurality of access points of the wireless local area network, wherein said channel is selected based on the all of the plurality of channel maps containing network structure information gathered and shared by each access point and using a criteria to minimize interference between the access points of the wireless local area network and minimize interference with other networks or wireless devices external to the wireless local area network; and assigning a transmission channel based on the locally computed channel selection for each access point of the plurality of access points of the wireless local area network.

12. The method according to claim 11, further comprising:

during the start-up process of the wireless local area network or when an access point is added to the wireless local area network, verifying, for each respective access point in the wireless local area network, after the transmission channel selection has taken place, whether there is direct interference with an access point that is within a corresponding range and has been assigned a same transmission channel;

when interference is detected among two or more access points, carrying out an automatic transmit power selection, by reducing transmit powers assigned to the two or more access points in conflict.

13. The method according to claim 12, further comprising:

when a first access point in the wireless local area network receives an active or passive scan request from a station, communicating to the one or more second access points that the station has been detected;

obtaining a list of listed access points in the wireless local area network that receive a scan request from the station;

obtaining a signal-to-noise-plus-interference (SNIR) ratio between each one of said listed access points and the station;

assigning a particular access point with a highest signal-to-noise-plus-interference (SNIR) ratio to provide service to the station.

14. The method according to claim 13, further comprising verifying that the particular access point has capacity sufficient to accept an additional connection, based on a determination that a load of said particular access point does not exceed a predetermined threshold.

15. The method according to claim 13, wherein a respective SNIR ratio associated with a corresponding access point represents a SNIR ratio with which the corresponding access point detects the station, wherein in order to obtain said SNIR ratios, each respective access point that receives a scan request directly calculates a corresponding SNIR ratio.

16. The system according to claim 1, wherein the network structure information transmitted and gathered by all the access points of the wireless local area network comprises a list of preferred channels containing the channels on which the access point can operate in order of preference.

17. The system according to claim 1, wherein:

each access point is configured to transmit the locally computed channel selection to the rest of the access points of the wireless local area network; and each access point is configured to verify that there are no discrepancies between the channel selection locally computed and the channel selection communicated by the rest of the access points.

18. The method according to claim 10, wherein the network structure information transmitted and gathered by all the access points of the wireless local area network comprises a list of preferred channels containing the channels on which the access point can operate in order of preference.

19. The method according to claim 10, wherein the channel selection further comprises:

each access point transmitting the locally computed channel selection to the rest of the access points of the wireless local area network; and each access point verifying that there are no discrepancies between the channel selection locally computed and the channel selection communicated by the rest of the access points.

* * * * *